United States Patent
Hirota et al.

(10) Patent No.: US 8,983,736 B2
(45) Date of Patent: Mar. 17, 2015

(54) GRILLE SHUTTER CONTROL DEVICE

(75) Inventors: Koichi Hirota, Takahama (JP);
Yoshimasa Asano, Kariya (JP); Hitoshi Takayanagi, Kariya (JP); Masayuki Nomura, Nagakute (JP); Tatsuya Shimizu, Okazaki (JP); Hironori Kanasaki, Toyota (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/005,088

(22) PCT Filed: Mar. 13, 2012

(86) PCT No.: PCT/JP2012/056382
§ 371 (c)(1),
(2), (4) Date: Sep. 13, 2013

(87) PCT Pub. No.: WO2012/128122
PCT Pub. Date: Sep. 27, 2012

(65) Prior Publication Data
US 2014/0005896 A1 Jan. 2, 2014

(30) Foreign Application Priority Data
Mar. 18, 2011 (JP) .................................. 2011-061435

(51) Int. Cl.
*B60K 11/08* (2006.01)
*F01P 11/10* (2006.01)
(Continued)

(52) U.S. Cl.
CPC ................. *B60K 11/08* (2013.01); *F01P 11/10* (2013.01); *G06F 1/00* (2013.01); *B60K 11/085* (2013.01); *F01P 7/12* (2013.01); *F01P 2031/00* (2013.01)

USPC .......... 701/49; 701/36; 123/41.04; 123/41.06; 180/68.1

(58) Field of Classification Search
None
See application file for complete search history.

(56) References Cited

U.S. PATENT DOCUMENTS

2003/0019670 A1* 1/2003 Matz et al. .................... 180/6.2
2004/0238246 A1* 12/2004 Ceccarani et al. ........... 180/68.1
(Continued)

FOREIGN PATENT DOCUMENTS

EP          2233341 A1 *  9/2010
JP        2005 500935     1/2005
(Continued)

OTHER PUBLICATIONS

International Search Report Issued Jun. 12, 2012 in PCT/JP12/056382 Filed Mar. 13, 2012.

*Primary Examiner* — John R Olszewski
*Assistant Examiner* — Jeffrey Boomer
(74) *Attorney, Agent, or Firm* — Oblon, McClelland, Maier & Neustadt, L.L.P.

(57) ABSTRACT

A grille shutter control device is provided with a control section configured so as to open and close a shutter adapted to be provided in an air introduction path for introducing air ahead of the vehicle into an engine compartment. The grille shutter control device drives and controls first and second drive units. The grille shutter control device is provided with: an abnormality detecting section configured to detect an abnormality in the operation of the shutter on the basis of the condition of the shutter after the start of operation thereof; and an informing section for informing, on the basis of an abnormality in the operation detected by the abnormality detection section, the user of the abnormality in the operation of the shutter.

8 Claims, 9 Drawing Sheets

(51) Int. Cl.
*F01P 7/12* (2006.01)
*G06F 1/00* (2006.01)

(56) References Cited

U.S. PATENT DOCUMENTS

| | | | |
|---|---|---|---|
| 2006/0102399 A1* | 5/2006 | Guilfoyle et al. | 180/68.1 |
| 2010/0083917 A1 | 4/2010 | Saida et al. | |
| 2010/0243351 A1* | 9/2010 | Sakai | 180/68.1 |
| 2010/0282533 A1 | 11/2010 | Sugiyama | |
| 2011/0118945 A1* | 5/2011 | Mochizukii | 701/49 |
| 2012/0100790 A1* | 4/2012 | Miesterfeld et al. | 454/75 |
| 2013/0147619 A1* | 6/2013 | Shin et al. | 340/449 |
| 2013/0268164 A1* | 10/2013 | Sugiyama | 701/49 |
| 2013/0275009 A1* | 10/2013 | Sakai | 701/49 |
| 2013/0338870 A1* | 12/2013 | Farmer et al. | 701/29.2 |

FOREIGN PATENT DOCUMENTS

| | | |
|---|---|---|
| JP | 2010 084723 | 4/2010 |
| JP | 2010 247819 | 11/2010 |
| JP | 2010 260440 | 11/2010 |
| KR | 100748166 * | 8/2007 |

* cited by examiner

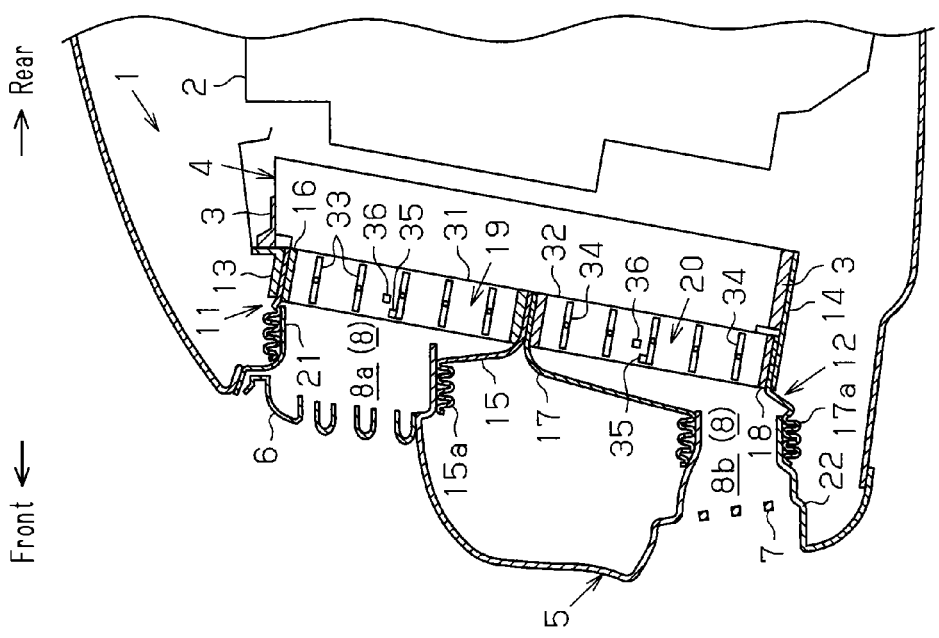

Checks Fully Opened Position

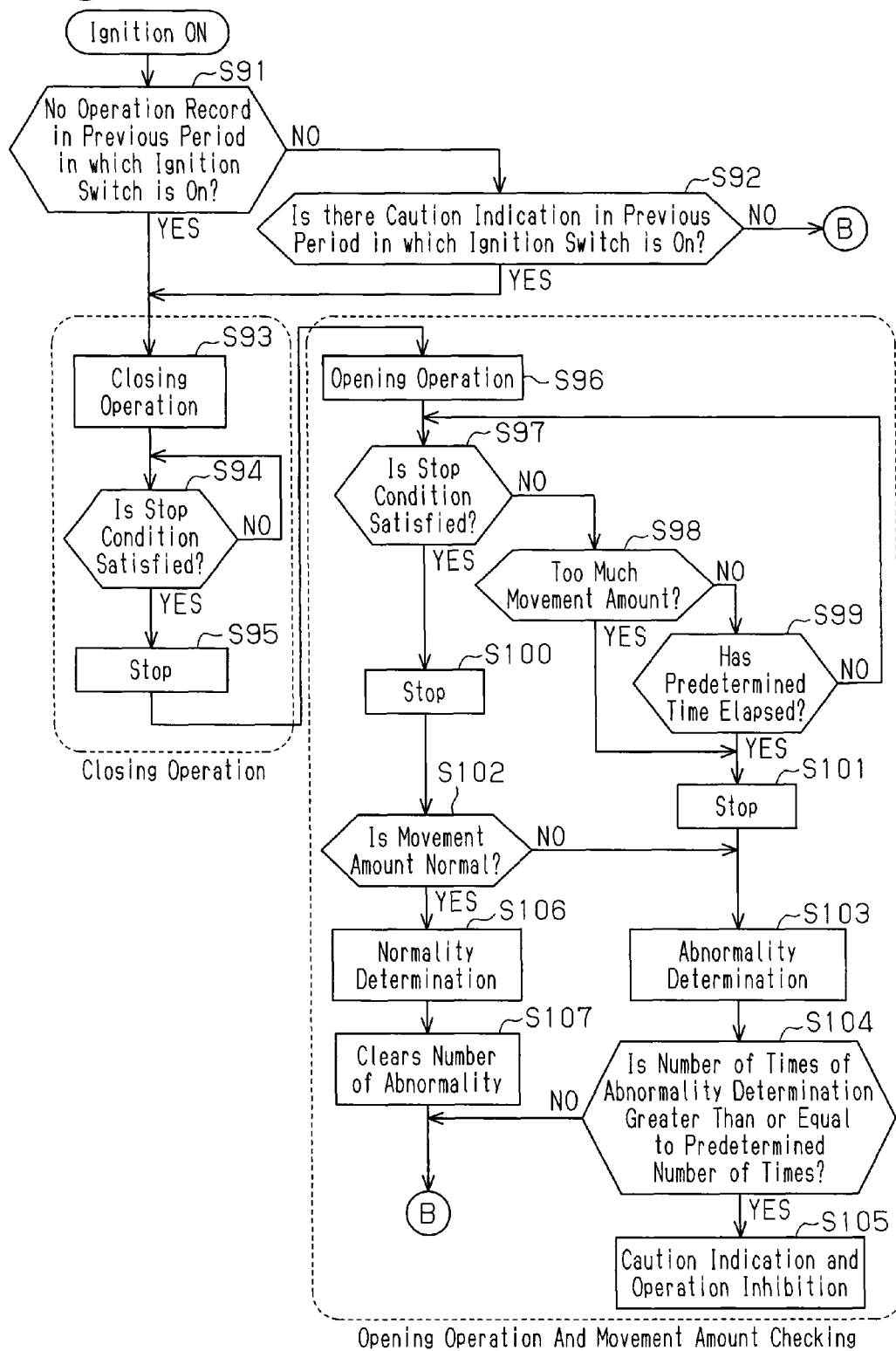

GRILLE SHUTTER CONTROL DEVICE

FIELD OF THE INVENTION

The present invention relates to a grille shutter control device that controls a shutter provided in an air introduction path for introducing air ahead of a vehicle into the engine compartment to selectively open and close the shutter.

BACKGROUND OF THE INVENTION

A conventional grille shutter control device is disclosed in, for example, Patent Document 1. Basically, when the coolant temperature detected by a coolant temperature sensor is less than or equal to a predetermined temperature (for example, 80° C.), the device closes the shutter to prevent air from being introduced into the engine compartment, and improves warm-up performance of the engine. Also, when the coolant temperature detected by the coolant temperature sensor is greater than or equal to a predetermined temperature (for example, 90° C.), the device opens the shutter to introduce a large amount of air into the engine compartment, and cools the coolant circulating in a radiator.

PRIOR ART DOCUMENTS

Patent Documents

Patent Document 1: Japanese Laid-Open Patent Publication No. 2010-84723

SUMMARY OF THE INVENTION

In the device of Patent Document 1, detection of an abnormality in the operation of the shutter is not mentioned. In this case, a user is not likely to notice the abnormality of the shutter, and the shutter will be left in the abnormal state. Thus, for example, in a case in which the shutter is closed and has become inoperable, the cooling performance of the engine is reduced, and the engine might get overheated. Furthermore, if the engine is not overheated, the temperature in the engine compartment is constantly maintained at a high temperature. This accelerates deterioration over time of engine components, in particular, rubber or plastic components, and might reduce the durability.

That is, when the engine is overheated, the user will notice the abnormality through a coolant temperature gauge in the instrument panel. However, if the engine is not overheated, the user will not notice the abnormality, and the deterioration over time of the engine components is accelerated.

Accordingly, it is an objective of the present invention to provide a grille shutter control device that promptly eliminates an abnormality in the operation of a shutter.

To achieve the foregoing object and in accordance with one aspect of the present invention, a grille shutter control device is provided that includes a control section, an abnormality detection section, and an informing section. The control section is configured to control a drive unit that selectively opens and closes a shutter adapted to be provided in an air introduction path for introducing air ahead of a vehicle into an engine compartment. The abnormality detection section is configured to detect an abnormality in operation of the shutter based on the state after starting the operation of the shutter. The informing section informs a user of an abnormality in the operation of the shutter based on the abnormality detected by the abnormality detection section.

With this configuration, when an abnormality is detected by the abnormality detection section, the user is informed of the abnormality by the informing section. This urges the user for a repair at a repair shop such as a car dealer, and the abnormality in the operation of the shutter is promptly eliminated.

The grille shutter control device preferably further includes a retry section, which resumes the operation of the shutter when the abnormality is detected by the abnormality detection section, and an abnormality determining section configured to determine an abnormality in the operation of the shutter if the detection of the abnormality by the abnormality detection section is repeated by a predetermined number of times as the operation of the shutter is resumed by the retry section. The informing section informs the user of an abnormality in the operation of the shutter based on the determined abnormality.

With this configuration, if the detection of the abnormality by the abnormality detection section is repeated by a predetermined number of times as the operation of the shutter is resumed by the retry section, the abnormality determining section determines that there is an abnormality. Then, since the informing section informs the user based on the determined abnormality, for example, even if the abnormality is temporarily detected by the abnormality detection section, an unnecessary alarm is prevented from being given by the informing section, and an inconvenience caused by the alarm is reduced.

The grille shutter control device preferably further includes an abnormality determining section configured to determine an abnormality in the operation of the shutter if the detection of the abnormality by the abnormality detection section is repeated by a predetermined number of times. The informing section informs the user of an abnormality in the operation of the shutter based on the determined abnormality.

With this configuration, if detection of the abnormality by the abnormality detection section is repeated by a predetermined number of times, the abnormality determining section determines that there is an abnormality. Based on the determined abnormality, the informing section informs the user. Thus, for example, even if the abnormality is temporarily detected by the abnormality detection section, an unnecessary alarm is prevented from being given by the informing section, and an inconvenience caused by the alarm is reduced.

The grille shutter control device preferably further includes an abnormality confirmation section configured to confirm an abnormality in the operation of the shutter when the abnormality determination by the abnormality determining section is repeated by a predetermined number of times. The informing section informs the user of an abnormality in the operation of the shutter based on the confirmed abnormality in the operation.

With this configuration, if determination of the abnormality by the abnormality determining section is repeated by a predetermined number of times, the abnormality confirmation section confirms that there is an abnormality. Based on the confirmed abnormality, the informing section informs the user. Thus, for example, even if the abnormality is temporarily determined by the abnormality determining section, an unnecessary alarm is prevented from being given by the informing section, and an inconvenience caused by the alarm is reduced. Moreover, the reliability of the alarm by the informing section is improved.

The grille shutter control device preferably further includes a first operating section, which operates the shutter based on vehicle information, and a second operating section. If there is no operation record of the shutter by the first operating section based on the vehicle information during a previous period in which an ignition switch was on, the second operating section operates the shutter when the ignition switch is switched on.

With this configuration, if there is no operation record of the shutter by the first operating section based on the vehicle information during the previous period in which the ignition switch was on, that is, the period from when the ignition switch was previously switched on to when the ignition switch was switched off, there is no opportunity for detecting an abnormality by the abnormality detection section through the above-mentioned period. In this case, the next time the ignition switch is switched on, the second operating section forces the shutter to operate, so that an opportunity for detecting an abnormality by the abnormality detection section is obtained. Thus, for example, the shutter is prevented from being left for a long period of time without being given an opportunity for detecting an abnormality by the abnormality detection section.

The grille shutter control device preferably further includes an inhibiting section configured to control inhibition of the operation of the shutter in accordance with an alarm given by the informing section, a third operating section, and a cancellation section. If there was an alarm given by the informing section during the previous period in which the ignition switch was on, the third operating section operates the shutter when the ignition switch is switched on. The cancellation section is configured to cancel the state in which the operation of the shutter is inhibited by the inhibiting section based on non-detection of the abnormality by the abnormality detection section associated with operation of the shutter by the third operating section.

With this configuration, if there was an alarm by the informing section during the previous period in which the ignition switch was on, that is, the period from when the ignition switch was previously switched on to when the ignition switch was switched off, the inhibiting section inhibits the operation of the shutter. In this case, the third operating section forces the shutter to operate the next time the ignition switch is switched on, so that an opportunity for detecting an abnormality by the abnormality detection section is ensured. Then, based on non-detection of the abnormality by the abnormality detection section, the cancellation section cancels the state in which the operation of the shutter is inhibited by the inhibiting section. If the cause of the alarm by the informing section during the previous period in which the ignition switch was on is, for example, the adhesion of the shutter by freezing, the cause might be eliminated by subsequent melting. Therefore, the inhibiting section is prevented from unnecessarily continuing to inhibit the operation of the shutter by the temporary alarm generated by the informing section.

The grille shutter control device preferably further includes an inhibiting section and a third operating section. The inhibiting section is configured to control inhibition of the operation of the shutter in accordance with an alarm given by the informing section. When there was an alarm given by the informing section during the previous period in which the ignition switch was on, the third operating section operates the shutter when the ignition switch is switched on. Based on non-detection of the abnormality by the abnormality detection section associated with the operation of the shutter by the third operating section, the grille shutter control device cancels the alarm given by the informing section and the state in which the operation of the shutter is inhibited by the inhibiting section. Based on detection of the abnormality by the abnormality detection section associated with the operation of the shutter by the third operating section, the grille shutter control device immediately informs the user of the detection by using the informing section and inhibits operation of the shutter by using the inhibiting section.

With this configuration, even in a case of the configuration in which the alarm by the informing section and the inhibition of the operation of the shutter by the inhibiting section are temporarily cancelled at the previous time when the ignition switch is switched off, the alarm by the informing section and the inhibition of the operation of the shutter by inhibiting section are immediately performed if an abnormality is detected by the abnormality detection section as the third operating section operates the shutter.

The grille shutter control device is preferably configured to have the following configurations. That is, the abnormality detection section detects an abnormality in the operation of the shutter when at least one of the following is the case. After the operation of the shutter is started, the movement position is out of a predetermined range when the operation is stopped upon satisfaction of a predetermined stop condition. After the operation of the shutter is started, the movement amount is less than a predetermined movement amount when the operation is stopped upon satisfaction of the predetermined stop condition. The predetermined stop condition is satisfied although the elapsed time after starting the operation of the shutter has not reached a first predetermined time. The predetermined stop condition is not satisfied although the elapsed time after starting the operation of the shutter has exceeded a second predetermined time.

With this configuration, for example, when using threshold determining of the drive force of the drive unit (or physical quantity that correlates with this) as the stop condition, for example, if the load is increased due to adhesion of the shutter or a foreign matter being caught, the stop condition is satisfied earlier than normal.

In this case, for example, the movement position when stopping the operation upon satisfaction of the stop condition is displaced. Therefore, by monitoring the movement position when the operation is stopped upon satisfaction of the stop condition, the abnormality is detected if the movement position is out of the predetermined range.

Alternatively, the movement amount is reduced when the operation is stopped upon satisfaction of the stop condition. Therefore, by monitoring the movement amount when the operation is stopped upon satisfaction of the stop condition, the abnormality is detected if the movement amount is less than the predetermined movement amount.

Alternatively, the stop condition is satisfied by a time period shorter than normal. Therefore, by monitoring the elapsed time after the operation of the shutter is started, the abnormality is detected if the stop condition is satisfied although the elapsed time has not reached the first predetermined time.

For example, if there is an abnormality in the power transmission of the drive unit (including a mechanism that is linked to the shutter), extended time is required for the stop condition to be satisfied. Therefore, by monitoring the elapsed time after the operation of the shutter is started, the abnormality is detected if the stop condition is not satisfied although the elapsed time has exceeded the second predetermined time.

EFFECTS OF THE INVENTION

The present invention provides a grille shutter control device that allows an abnormality in the operation of a shutter to be promptly eliminated.

BRIEF DESCRIPTION OF THE DRAWINGS

FIG. 1 is a side view illustrating the inside of the engine compartment of a vehicle in a state in which a grille shutter is open;

FIG. 2 is a side view illustrating the inside of the engine compartment of the vehicle in a state in which the grille shutter is closed;

FIG. 7 is a flowchart illustrating the control manner of a grille shutter control device according to a fourth embodiment of the present invention.

DETAILED DESCRIPTION OF THE PREFERRED EMBODIMENTS

First Embodiment

Figure 3:
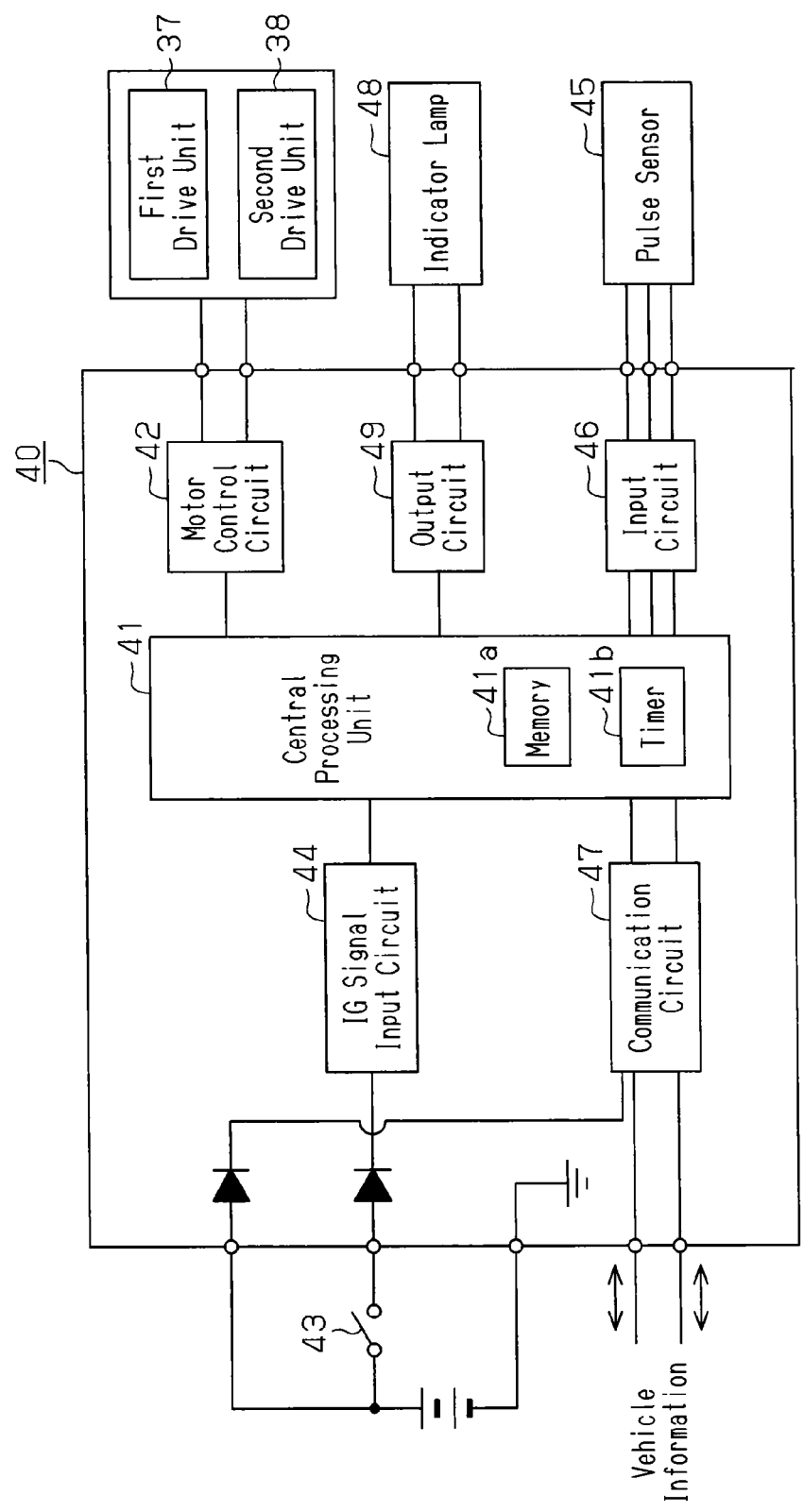
FIG. 3 is a block diagram illustrating the electrical configuration of the present invention.

A grille shutter control device according to a first embodiment of the present invention will now be described with reference to FIG. 1. As shown in FIG. 1, an engine compartment 1 provided on the front portion of a vehicle such as an automobile includes a driving engine 2 and a radiator 4 for cooling an engine coolant. The radiator 4 is mounted on a vehicle body 3 on the front side of the engine 2. A bumper 5, which is attached to the vehicle body 3, extends in the vehicle widthwise direction (direction perpendicular to the sheet of the drawing) at the middle of the radiator 4 in the vehicle height direction and on the front side of the radiator 4.

A first front grille 6 and a second front grille 7 are attached on the upper side and lower side of the bumper 5. The first front grille 6 forms a first air introduction path 8a between the upper front surface of the radiator 4 and the first front grille 6, and the second front grille 7 forms a second air introduction path 8b between the lower front surface of the radiator 4 and the second front grille 7. The first and second air introduction paths 8a, 8b configure an air introduction path 8 for introducing air ahead of the vehicle into the front surface of the radiator 4.

Substantially, a rectangular first frame 11 and a rectangular second frame 12 are arranged adjacent to the front side of the radiator 4 next to one another in the vehicle height direction. The first frame 11 and the second frame 12 are attached to the vehicle body 3 via brackets 13, 14, respectively. The first frame 11 includes a first main frame 15, which has a first bellows-like portion 15a at its distal end and is secured to the lower surface of the bracket 13, and a first housing frame 16, which is secured to the inner side of the first main frame 15. Similarly, the second frame 12 includes a second main frame 17, which has a second bellows-like portion 17a at its distal end and is secured to the upper surface of the bracket 14, and a second housing frame 18, which is secured to the inner side of the second main frame 17. The first housing frame 16 is arranged to surround the upper front surface of the radiator 4 and forms a substantially rectangular first air flow path 19 on its inner side. The second housing frame 18 is arranged to surround the lower front surface of the radiator 4 and forms a substantially rectangular second air flow path 20 on its inner side.

In the first main frame 15, the inner upper portion of the first bellows-like portion 15a is pressed against a wall member 21, which extends rearward of the vehicle from the upper side of the first front grille 6, and the inner lower portion of the first bellows-like portion 15a is pressed against the upper wall portion of the bumper 5, so that the upper side and the lower side of the first air introduction path 8a are defined. The air ahead of the vehicle is introduced into the upper front surface of the radiator 4 through the first front grille 6 and the first air flow path 19. The first air flow path 19 configures part of the first air introduction path 8a. Similarly, in the second main frame 17, the inner upper portion of the second bellows-like portion 17a is pressed against the lower wall portion of the bumper 5, and the inner lower portion of the second bellows-like portion 17a is pressed against a wall member 22, which extends rearward of the vehicle from the lower side of the second front grille 7, so that the upper side and the lower side of the second air introduction path 8b are defined. The air ahead of the vehicle is introduced into the lower front surface of the radiator 4 through the second front grille 7 and the second air flow path 20. The second air flow path 20 configures part of the second air introduction path 8b.

A first shutter 31 and a second shutter 32, which control the flow rate of the air ahead of the vehicle introduced into the front surface of the radiator 4, are provided on the inner circumference of the first and second housing frames 16, 18, that is, in the first and second air flow paths 19, 20. The first shutter 31 includes first movable fins 33, which are arranged with intervals in the vehicle height direction and are rotatable about an axis extending in the vehicle widthwise direction. The first movable fins 33 are supported by the first housing frame 16 on both ends in the vehicle widthwise direction, and all the first movable fins 33 are linked with each other to rotate integrally. Similarly, the second shutter 32 includes second movable fins 34, which are arranged with intervals in the vehicle height direction and are rotatable about an axis extending in the vehicle widthwise direction. The second movable fins 34 are supported by the second housing frame 18 on both ends in the vehicle widthwise direction, and all the second movable fins 34 are linked with each other to rotate integrally. The first and second shutters 31, 32 selectively open and close the respective first and second air flow paths 19, 20 (first and second air introduction paths 8a, 8b) by rotating the first and second movable fins 33, 34 about the associated axes.

That is, as shown in FIG. 1, the first and second movable fins 33, 34 are arranged to extend in a direction that is substantially the same as the vehicle fore-and-aft direction, that is, the opening direction of the first and second air flow paths 19, 20 (hereinafter, referred to as a "fully opened position"). In this state, since the first and second air flow paths 19, 20 are fully opened, the flow rate of the air ahead of the vehicle introduced into the front surface of the radiator 4 is the maximum. In contrast, as shown in FIG. 2, the first and second movable fins 33, 34 are arranged in a state that is rotated counterclockwise from the fully opened position such that the edges of the fins 33, 34 overlap each other (hereinafter, referred to as a "fully closed position"). In this state, the first and second air flow paths 19, 20 are closed, and introduction of the air ahead of the vehicle into the front surface of the radiator 4 is blocked. The first and second shutters 31, 32 configure a shutter.

A full-open stopper 35 is arranged in each of the first and second housing frames 16, 18. The full-open stoppers 35 are arranged on a rotation path of the first and second movable fins 33, 34 in an illustrated clockwise direction, and lock the first and second movable fins 33, 34 (that is, all the first and second movable fins 33, 34) at the fully opened position. Also, a full-close stopper 36 is arranged in each of the first and second housing frames 16, 18. The full-close stoppers 36 are arranged on a rotation path of the first and second movable fins 33, 34 in an illustrated counter-clockwise direction, and lock the first and second movable fins 33, 34 (that is, all the first and second movable fins 33, 34) at the fully closed position. That is, the movable range of the first and second movable fins 33, 34 is set between the fully opened position and the fully closed position, at which rotation of the first and second movable fins 33, 34 is restricted by the full-open stoppers 35 and the full-close stoppers 36. The first and second movable fins 33, 34 are arranged at any rotational position between the fully opened position and the fully closed position so as to continuously control the flow rate of the air ahead of the vehicle introduced into the front surface of the radiator 4.

The electrical configuration of the present embodiment will now be described. As shown in FIG. 3, for example, a first drive unit 37 and a second drive unit 38, which include a DC motor with a reduction gear, are mechanically linked to the first and second shutters 31, 32 and are electrically connected to, for example, a control device 40 mainly formed by a microcomputer. The first and second drive units 37, 38 configure a drive unit, and are controlled by the control device 40 to selectively open and close the first and second shutters 31, 32.

That is, the control device 40 is equipped with a central processing unit (CPU) 41, which includes a memory 41a and a timer 41b, and a motor control circuit 42, which is electrically connected to the CPU 41. The control device 40 is electrically connected to the first and second drive units 37, 38 via the motor control circuit 42. Upon receipt of a power-on command from the CPU 41, the motor control circuit 42 supplies electricity to the first and second drive units 37, 38 with a polarity corresponding to the rotational direction. Thus, the first and second movable fins 33, 34 move to the fully opened position or the fully closed position.

An IG signal input circuit 44, which inputs signals representing on/off operation of an ignition switch 43, is electrically connected to the CPU 41. Also, for example, an input circuit 46 is electrically connected to the CPU 41. The input circuit 46 inputs signals (pulse signals) representing the opened/closed position (absolute value) of the first movable fins 33 or the second movable fins 34 from a pulse sensor 45 configured by a pair of hall elements. Furthermore, a communication circuit 47, which receives various types of vehicle information detected by appropriate sensors, is electrically connected to the CPU 41. More specifically, the communication circuit 47 receives at least one of a vehicle speed signal representing the vehicle speed, a coolant temperature signal representing the coolant temperature in the radiator 4, an ambient temperature signal representing the ambient temperature around the vehicle, a refrigerant pressure signal representing the refrigerant pressure in an air conditioning system, and a condition signal representing the on-off state or the cooling/heating operation condition of the air conditioning system. Based on the signals received by the communication circuit 47, the CPU 41 obtains the vehicle information such as the vehicle speed, the coolant temperature in the radiator 4, the temperature around the vehicle, the refrigerant pressure of the air conditioning system, the on-off state and the cooling/heating operation condition of the air conditioning system.

Furthermore, an output circuit 49 is electrically connected to the CPU 41. The output circuit 49 outputs a drive signal to an indicator lamp 48, for example, an LED. The indicator lamp 48 serves as an informing section. The indicator lamp 48 is installed in, for example, an instrument panel. Upon receipt of the power-on command from the CPU 41, the output circuit 49 outputs a drive signal to the indicator lamp 48. Thus, the indicator lamp 48 is turned on.

When determining that predetermined opening/closing operation conditions are satisfied based on the on-off state of the ignition switch 43, the opened/closed position of the first movable fins 33 or the second movable fins 34, and various types of vehicle information, the CPU 41 starts outputting the power-on command to the motor control circuit 42 in order to start opening or closing the first and second shutters 31, 32. Thus, the first and second drive units 37, 38 are activated, and the first and second movable fins 33, 34 move to the fully opened position or the fully closed position. When the movement of the first and second movable fins 33, 34 to the fully opened position or the fully closed position is completed, the movement of the first and second movable fins 33, 34 is restricted in the afore-mentioned manner. Thus, a motor is locked in the first and second drive units 37, 38, and associated increase in the load increases the amount of electricity supplied to the first and second drive units 37, 38. The CPU 41 detects that the movement of the first and second movable fins 33, 34 to the fully opened position or the fully closed position has been completed basically by monitoring the increase in the amount of electricity supplied to the first and second drive units 37, 38. Based on the detection, the CPU 41 stops outputting the power-on command to the motor control circuit 42 to stop opening or closing the first and second shutters 31, 32. In the present embodiment, the first and second drive units 37, 38 are configured to activate simultaneously such that the opening/closing operation of the first and second shutters 31, 32 and stopping of the operation synchronize.

The locking of the motor associated with the above-mentioned stop determination may be detected based on whether the pulse interval of the pulse sensor 45, which detects the motor rotation, is greater than or equal to a predetermined time.

Also, the CPU 41 detects an abnormality based on the state after starting the opening/closing operation of the first and second shutters 31, 32 (after the opening/closing operation conditions are satisfied) (abnormality detection section).

Figure 4A:
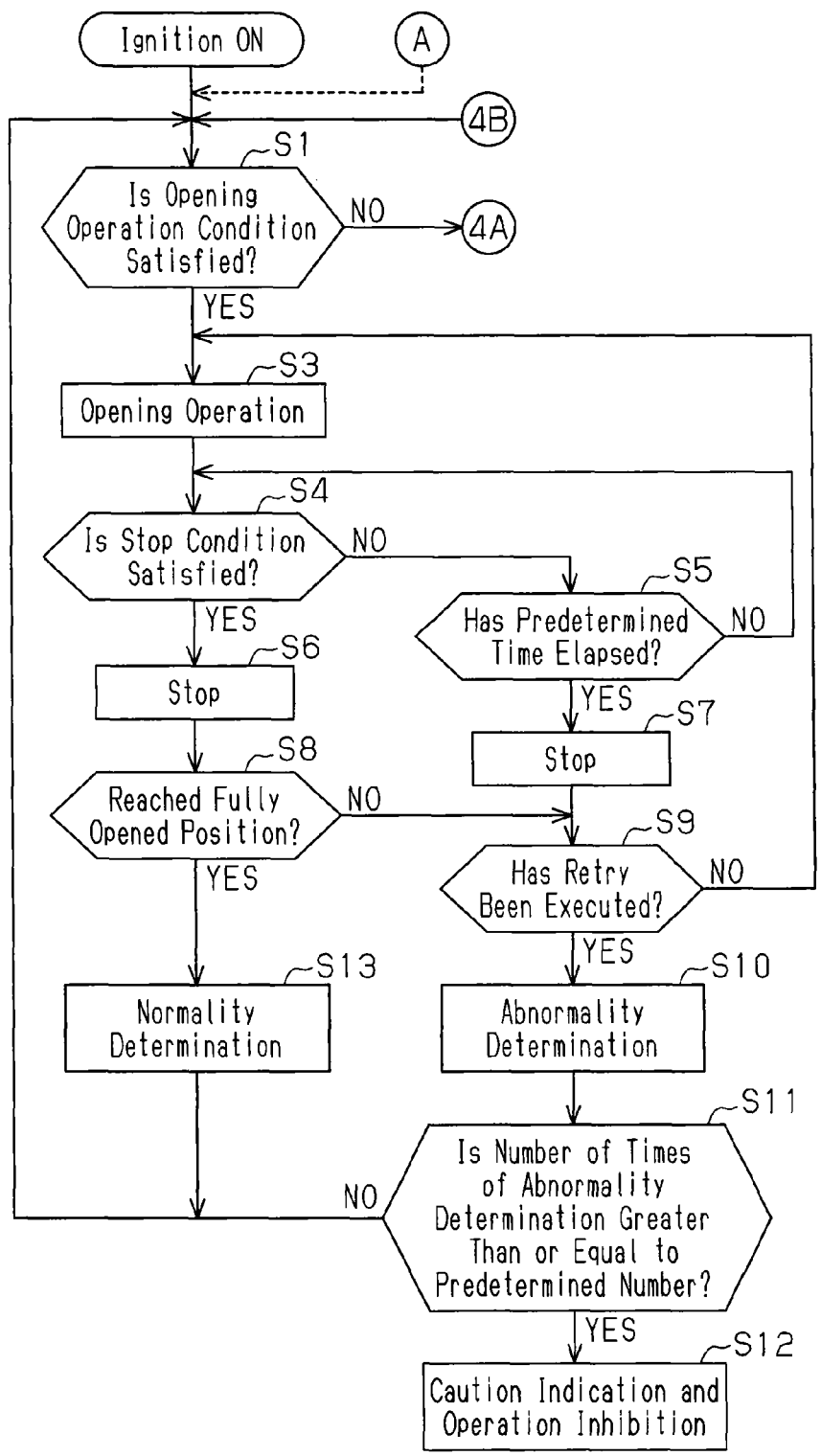
FIGS. 4A and 4B are flowcharts illustrating the control manner of a grille shutter control device according to a first embodiment of the present invention.
Figure 4B:
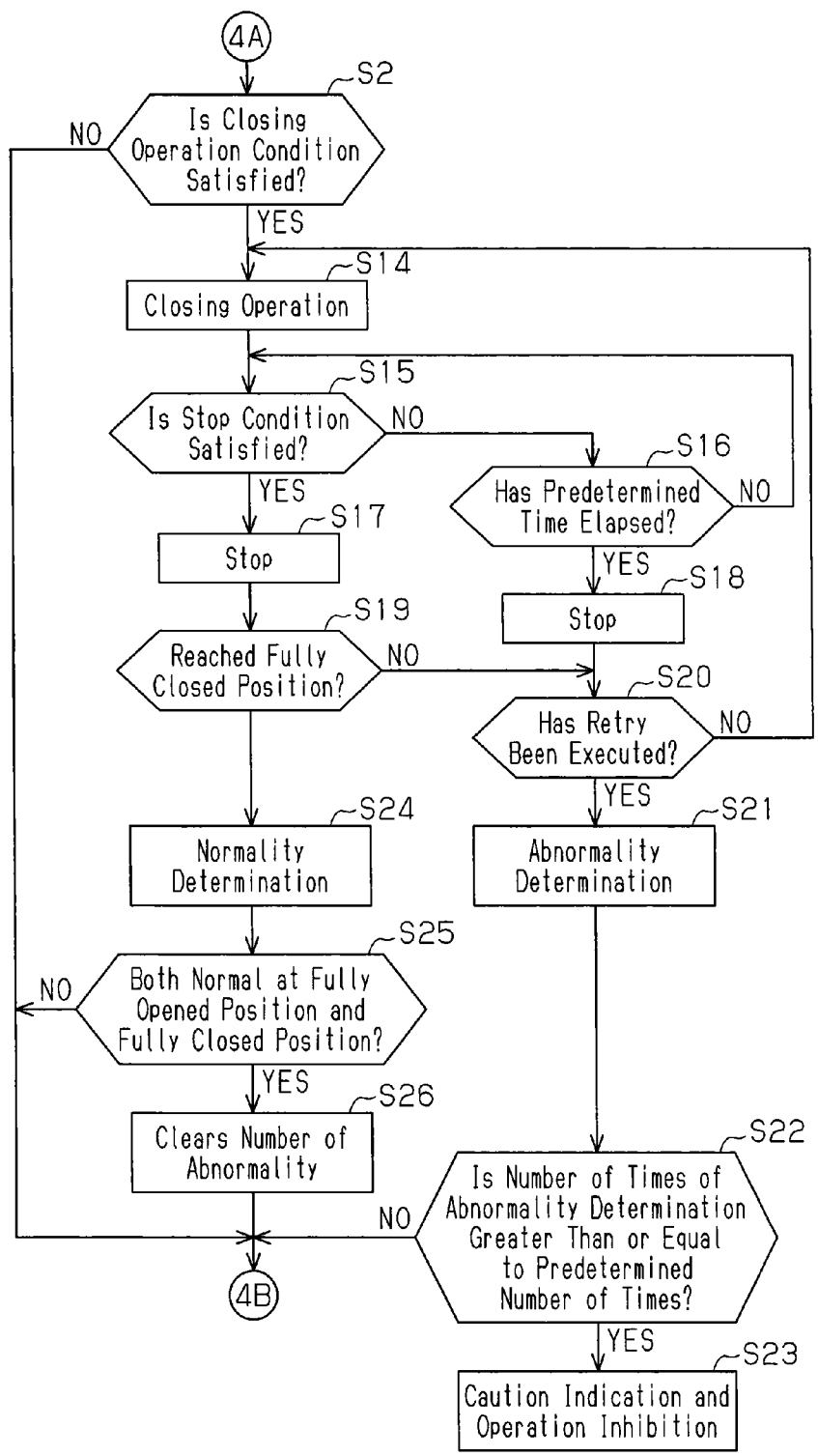

The manner in which the CPU 41 controls activation of the first and second drive units 37, 38, that is, the manner in which the CPU 41 controls opening and closing of the first and second shutters 31, 32 will now be described. As shown in FIG. 4A, when the routine is initiated as the ignition switch 43 is switched on, it is determined in step S1 whether the opening operation condition is satisfied. If it is determined that the opening operation condition is not satisfied, it is determined in step S2 whether the closing operation condition is satisfied. If it is determined that the closing operation condition is not satisfied, the CPU 41 returns to step S1. That is, the CPU 41 waits until the opening operation condition is satisfied in step S1 or the closing operation condition is satisfied in step S2, and then proceeds to the subsequent steps.

If it is determined in step S1 that the opening operation condition is satisfied, the CPU 41 proceeds to step S3, and opens the first and second shutters 31, 32 (first operating section). More specifically, the CPU 41 outputs the power-on command, which indicates to open the first and second shutters 31, 32, to the motor control circuit 42. The CPU 41 functions as the first operating section. Accordingly, the first and second drive units 37, 38 are supplied with electricity with the polarity corresponding to the opening operation, and the first and second movable fins 33, 34 move to the fully opened position.

Then, in step S4, it is determined whether the stop condition is satisfied. The stop condition is a case in which the amount of electricity supplied to the first and second drive units 37, 38 exceeds a certain level indicating restriction of the movement of the first and second movable fins 33, 34. This is because the restriction of the movement of the first and second movable fins 33, 34 is normally considered as completion of the movement of the first and second movable fins 33, 34 to the fully opened position.

If it is determined in step S4 that the stop condition is not satisfied, it is determined in step S5 whether a predetermined time T1 has elapsed. If it is determined that the predetermined time T1 has not elapsed, the CPU 41 returns to step S4. If it is determined in step S4 that the stop condition is satisfied, the CPU 41 proceeds to step S6 and stops the opening operation of the first and second shutters 31, 32. Alternatively, if it is determined in step S5 that the predetermined time T1 has elapsed, the CPU 41 proceeds to step S7 and stops the opening operation of the first and second shutters 31, 32. That is, if it is determined that the stop condition is not satisfied in step S4, the CPU 41 continues the opening operation of the first and second shutters 31, 32 until the predetermined time T1 elapses. The predetermined time T1 is set based on the time during which the first and second movable fins 33, 34 that have started to open will reliably complete the movement to the fully opened position.

In step S6, if the opening operation of the first and second shutters 31, 32 is stopped, it is determined, in step S8, whether the first and second movable fins 33, 34 have reached the fully opened position. More specifically, it is determined whether the opened/closed position of the first and second movable fins 33, 34 detected by the pulse sensor 45 matches the fully opened position. If it is determined that the first and second movable fins 33, 34 have not reached the fully opened position, the CPU 41 determines that there is an abnormality (for example, increase in the load due to a foreign object that gets caught) of some kind that permits the stop condition to be satisfied (abnormality detection section), and proceeds to step S9. Furthermore, if the opening operation of the first and second shutters 31, 32 is stopped in step S7, the CPU 41 determines that there is an abnormality of some kind that prevents the stop condition from being satisfied (abnormality detection section), and proceeds to step S9. This is because, for example, if there is an abnormality in the power transmission of the first and second drive units 37, 38 (including the mechanism that links the first and second shutters 31, 32), extended time is required for the stop condition to be satisfied. The abnormality in the power transmission includes the state in which the first and second movable fins 33, 34 are immobile to the fully opened position due to, for example, slipping caused by missing teeth of the gear. The CPU 41 functions as the abnormality detection section.

In step S9, it is determined whether a retry has been executed. The retry is a process for resuming the opening operation of the first and second shutters 31, 32 suspended in step S6 or S7 when it is determined that there is the above-mentioned abnormality (retry section). The CPU 41 functions as the retry section. Therefore, if it is determined in step S9 that the retry has not been executed, the CPU 41 returns to step S3 and repeats the same process. If it is determined in step S9 that the retry has been executed, the CPU 41 proceeds to step S10 and determines that there is an abnormality (abnormality determining section). That is, if determination of the abnormality is repeated by a predetermined number of times (two times in the present embodiment) as the aforementioned opening operation of the first and second shutters 31, 32 is resumed, the CPU 41 determines that there is an abnormality in step S10. If the CPU 41 determines that there is an abnormality, the CPU 41 increments an abnormality determination counter CNT that counts the number of times of the abnormality determination. The CPU 41 functions as the abnormality determining section.

Subsequently, in step S11, it is determined whether the number of times of the abnormality determination is greater than or equal to a predetermined number of times based on whether the abnormality determination counter CNT is greater than or equal to a predetermined number NM. If it is determined that the number of times of the abnormality determination is greater than or equal to the predetermined number of times (abnormality confirmation section), a caution is indicated in step S12, and the operation of the first and second shutters 31, 32 is inhibited (inhibiting section). That is, the CPU 41 outputs the power-on command to the output circuit 49 indicating to turn on the indicator lamp 48. Accordingly, the indicator lamp 48 is turned on, and the user of the vehicle is informed of the abnormality of the first and second shutters 31, 32. Simultaneously, the CPU 41 inhibits outputting the power-on command to the motor control circuit (or inhibits the operation of the first and second shutters 31, 32). The CPU 41 functions as the abnormality confirmation section and the inhibiting section.

Also, if it is determined in step S8 that the first and second movable fins 33, 34 have reached the fully opened position, the CPU 41 proceeds to step S13 and determines that it is normal, and returns to step S1. Alternatively, if it is determined in step S11 that the number of times of abnormality determination is less than the predetermined number of times, the CPU 41 returns to step S1.

If it is determined in step S2 that the closing operation condition is satisfied, the CPU 41 proceeds to step S14, and closes the first and second shutters 31, 32 (first operating section). More specifically, the CPU 41 outputs a power-on command, which indicates to close the first and second shutters 31, 32, to the motor control circuit 42. Thus, the first and second drive units 37, 38 are supplied with electricity having the polarity corresponding to the closing operation, and the first and second movable fins 33, 34 move to the fully closed position. The CPU 41 functions as the first operating section.

Then, it is determined in step S15 whether the stop condition is satisfied. The stop condition is a case in which the amount of electricity supplied to the first and second drive units 37, 38 exceeds the certain level indicating restriction of the movement of the first and second movable fins 33, 34. This is because the restriction of the movement of the first and second movable fins 33, 34 is normally considered as completion of the movement of the first and second movable fins 33, 34 to the fully closed position.

If it is determined in step S15 that the stop condition is not satisfied, it is determined in step S16 whether a predetermined time T2 has elapsed. If it is determined that the predetermined time T2 has not elapsed, the CPU 41 returns to step S15. Also, if it is determined in step S15 that the stop condition is satisfied, the CPU 41 proceeds to step S17 and stops closing the first and second shutters 31, 32. Alternatively, if it is determined in step S16 that the predetermined time T2 has elapsed, the CPU 41 proceeds to step S18 and stops closing the first and second shutters 31, 32. That is, if the CPU 41 determines in step S15 that the stop condition is not satisfied, the CPU 41 continues the closing operation of the first and second shutters 31, 32 until the predetermined time T2 elapses. The predetermined time T2 is set based on the time during which the first and second movable fins 33, 34 that have started closing will reliably complete the movement to the fully closed position.

If the closing operation of the first and second shutters 31, 32 is stopped in step S17, it is determined in step S19 whether the first and second movable fins 33, 34 have reached the fully closed position. More specifically, it is determined whether the opened/closed position of the first and second movable fins 33, 34 detected by the pulse sensor 45 matches the fully closed position. If it is determined that the first and second movable fins 33, 34 have not reached the fully closed position, the CPU 41 determines that there is an abnormality (for example, increase in the load due to a foreign object that gets caught) of some kind that permits the stop condition to be satisfied (abnormality detection section), and proceeds to step S20. Furthermore, if the closing operation of the first and second shutters 31, 32 is stopped in step S18, the CPU 41 determines that there is an abnormality of some kind that prevents the stop condition from being satisfied (abnormality detection section), and proceeds to step S20. This is because, for example, if there is an abnormality in the power transmission of the first and second drive units 37, 38, extended time is required for the stop condition to be satisfied. The abnormality in the power transmission includes the state in which the first and second movable fins 33, 34 are immobile to the fully closed position due to, for example, slipping caused by missing teeth of the gear.

In step S20, it is determined whether a retry has been executed. The retry is a process for resuming the closing operation of the first and second shutters 31, 32 suspended in step S17 or S18 when it is determined that there is an abnormality as described above (retry section). Therefore, if it is determined in step S20 that the retry has not been executed, the CPU 41 returns to step S14 and repeats the same process. Then, if it is determined in step S20 that the retry has been executed, the CPU 41 proceeds to step S21 and determines that there is an abnormality (abnormality determining section). That is, when the afore-mentioned abnormality determination is repeated by a predetermined number of times (two times in the preferred embodiment) as the afore-mentioned closing operation of the first and second shutters 31, 32 is resumed, the CPU 41 proceeds to step S21 and determines that there is an abnormality. The CPU 41 functions as the abnormality determining section. If the CPU 41 determines that there is an abnormality, the CPU 41 increments the abnormality determination counter CNT. That is, the abnormality determination counter CNT is a counted value of the number of times of the abnormality determination associated with opening/closing operation of the first and second shutters 31, 32.

Subsequently, in step S22, based on whether the abnormality determination counter CNT is greater than or equal to the predetermined number NM, it is determined whether the number of times of the abnormality determination is greater than or equal to the predetermined number of times. If it is determined that the number of times of the abnormality determination is greater than or equal to the predetermined number of times (abnormality confirmation section), a caution is indicated in step S23, and the operation of the first and second shutters 31, 32 is inhibited (inhibiting section). The CPU 41 functions as the abnormality confirmation section and the inhibiting section.

Also, in step S19, if it is determined that the first and second movable fins 33, 34 have reached the fully closed position, the CPU 41 proceeds to step S24 and determines that it is normal. Furthermore, in step S25, the CPU 41 determines whether the first and second movable fins 33, 34 are both normal at the fully opened position and the fully closed position, that is, the CPU 41 determines whether the opening operation of the first and second shutters 31, 32 is also determined to be normal (step S13). Then, if the first and second movable fins 33, 34 are both determined to be normal at the fully opened position and fully closed position, the CPU 41 proceeds to step S26 and clears the abnormality determination counter CNT to zero. If it is determined in step S22 that the number of times of abnormality determination is less than the predetermined number of times, the CPU 41 returns to step S1. Alternatively, if the CPU 41 determines, in step S25, that the first and second movable fins 33, 34 are both not normal at the fully opened position and the fully closed position, that is, the opening operation of the first and second shutters 31, 32 has not been determined to be normal, the CPU 41 returns to step S1. Alternatively, if the abnormality determination counter CNT is cleared in step S26, the CPU 41 returns to step S1.

Unless the caution is indicated, the above-mentioned routine is repeated during the period in which the ignition switch 43 is on, and is terminated when the ignition switch 43 is switched off. In particular, when the CPU 41 operates the first and second shutters 31, 32 upon satisfaction of the operation condition (the decision outcome of step S1 or S2 is positive) during the period in which the ignition switch 43 is on, the CPU 41 stores and maintains the operation record on the execution of the operation in the memory 41a with a battery backup. Alternatively, when indicating the caution (in step S12 or S23) during the period in which the ignition switch 43 is on, the CPU 41 stores and maintains the record on execution of the caution indication in the memory 41a with a battery backup.

The operation of the present embodiment will now be described.

In the present embodiment, if it is determined that there is an abnormality in the operation of the shutters associated with the opening/closing operation of the first and second shutters 31, 32, (the decision outcome of step S5 or S16 is positive, or the decision outcome of step S8 or S19 is negative), the CPU 41 determines that there is an abnormality on the precondition that a retry has been executed (step S10 or S21). Then, if it is determined that the number of times of abnormality determination is greater than or equal to the predetermined number of times (the decision outcome of step S11 or S22 is positive), the indicator lamp 48 is turned on and the caution is indicated. Thus, the user is informed of the abnormality in the first and second shutters 31, 32.

As described above, the present embodiment has the following advantages.

(1) The user is informed of the abnormality in the operation of the first and second shutters 31, 32 with the indicator lamp 48 based on the detected abnormality (the decision outcome of step S5 or S16 is positive, or the decision outcome of step S8 or S19 is negative). This urges the user for a repair at a repair shop such as a car dealer, and the abnormality in the operation of the first and second shutters 31, 32 is promptly eliminated. Then, for example, the first and second movable fins 33, 34 are prevented from being adhered to the fully closed position and maintained in a state in which the temperature in the engine compartment 1 is constantly high, thus preventing acceleration of deterioration over time of the engine components.

(2) When an abnormality in the operation of the shutters is detected, if detection of the abnormality is repeated by the predetermined number of times as the operation of the first and second shutters 31, 32 is resumed (the decision outcome of step S9 or S20 is positive), the CPU 41 determines that there is an abnormality in the operation of the shutters. Since the indicator lamp 48 informs the user based on the determined abnormality, for example, even if the abnormality is temporarily detected, an unnecessary alarm is prevented from being given by the indicator lamp 48, and an inconvenience caused by the alarm is reduced.

(3) If the abnormality determination is made by the predetermined number of times (the decision outcome of step S11 or S22 is positive), the abnormality in the operation of the shutters is confirmed. Since the indicator lamp 48 informs the user based on the confirmed abnormality, for example, even if the abnormality is temporarily determined, an unnecessary alarm is further prevented from being given by the indicator lamp 48, and an inconvenience caused by the informing section is reduced. Alternatively, by reducing a false alarm by the indicator lamp 48, the reliability of the alarm (caution indication) is improved.

(4) The pulse sensor 45 monitors the movement position (opened/closed position) when the operation of the first and second shutters 31, 32 is stopped upon satisfaction of the stop condition. When the movement position is out of the predetermined range (does not match with the fully opened position or the fully closed position), the abnormality is detected. Alternatively, the elapsed time after starting operation of the first and second shutters 31, 32 is monitored by the timer 41b. If the stop condition is not satisfied even when the elapsed time exceeds the predetermined time (T1, T2), the abnormality is detected.

(5) When the ignition switch 43 is switched on and the engine 2 is started, the abnormality of the first and second shutters 31, 32 is detected upon satisfaction of the operation condition (the decision outcome of step S1 or S2 is positive) without waiting for the vehicle to start traveling.

Second Embodiment

A grille shutter control device according to a second embodiment of the present invention will now be described with reference to FIGS. 5A and 5B. The second embodiment differs from the first embodiment in that the operation of the first and second shutters 31, 32 is controlled while considering the on-off state of the ignition switch 43. For example, the CPU 41 determines whether there is an operation record of the first and second shutters 31, 32 upon satisfaction of the operation condition (the decision outcome of step S1 or S2 is positive) during the previous period in which the ignition switch 43 was on, that is, during the period from when the ignition switch 43 was previously switched on to when the ignition switch 43 was switched off. If there is no operation record, or if there is the caution indication and the operation inhibition (step S12 or S23), the CPU 41 forces the first and second shutters 31, 32 to operate when the ignition switch 43 is switched on. Thus, the detailed description of the part that is the same as the first embodiment will be omitted.

Figure 5A:
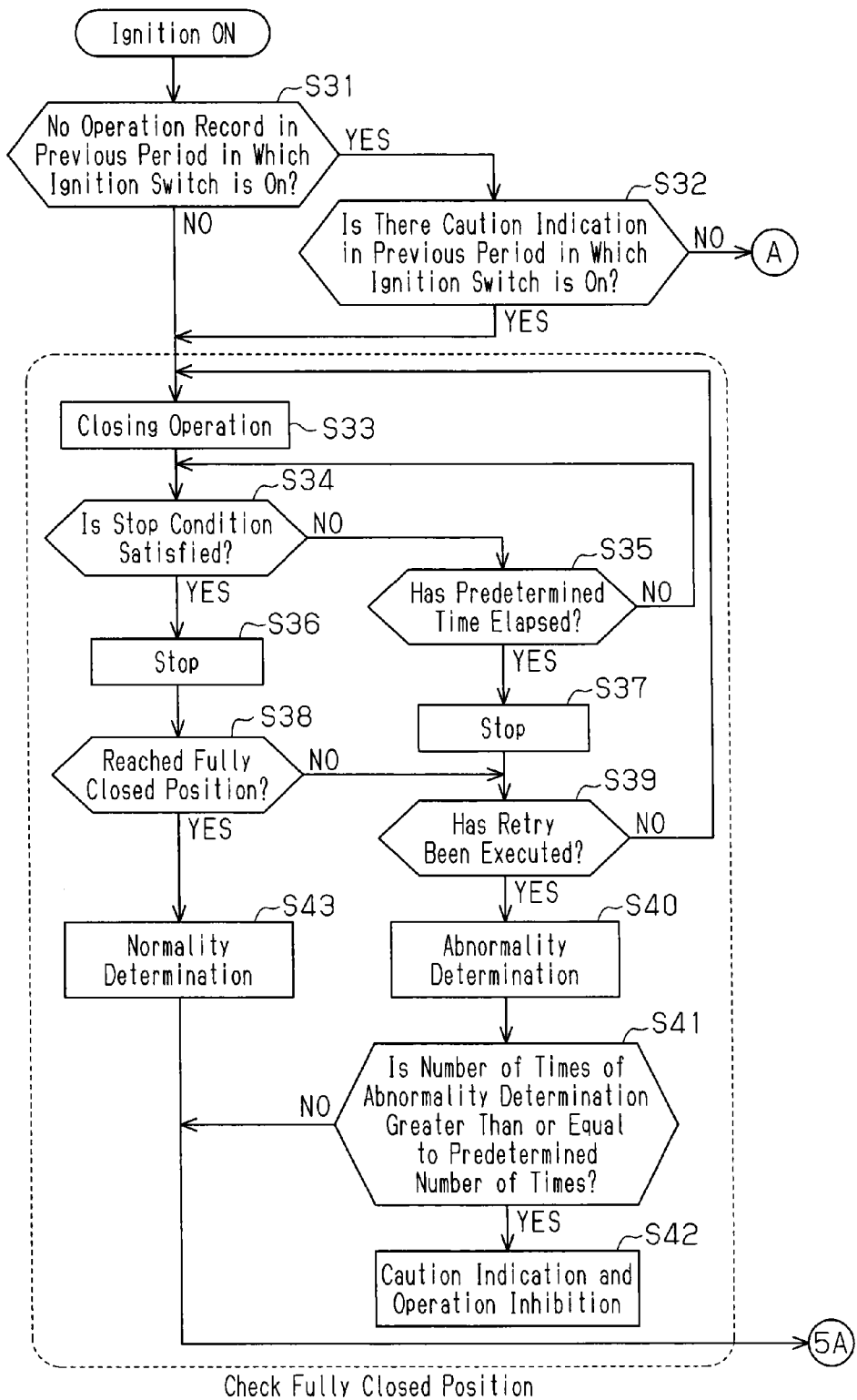
FIGS. 5A and 5B are flowcharts illustrating the control manner of a grille shutter control device according to a second embodiment of the present invention.
Figure 5B:
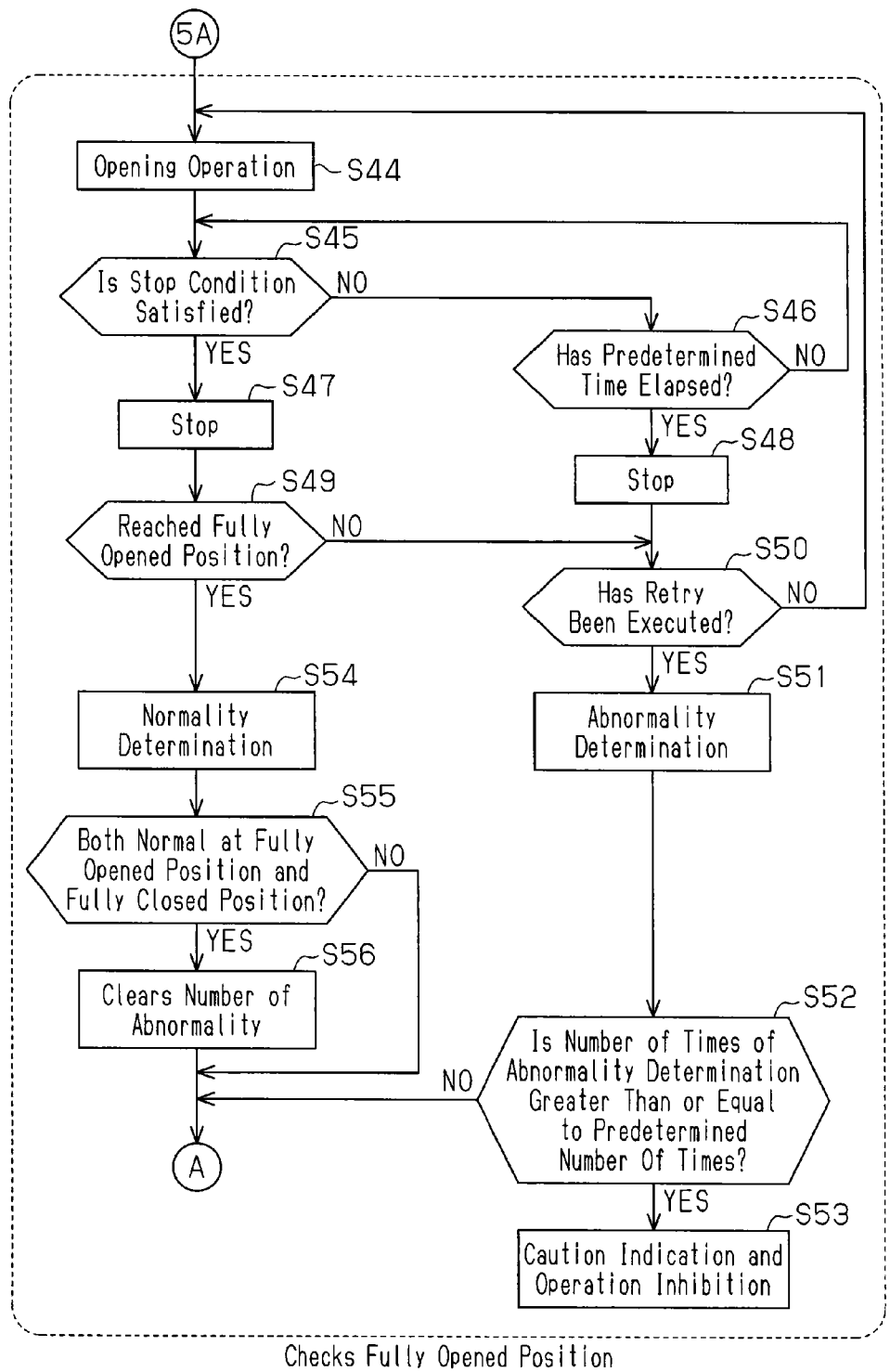

As shown in FIG. 5A, the routine is started when the ignition switch 43 is switched on. In step S31, it is determined whether there is an operation record of the first and second shutters 31, 32 upon satisfaction of the operation condition during the previous period in which the ignition switch 43 was on. Then, if it is determined that there is the operation record during the previous period in which the ignition switch 43 was on, the CPU proceeds to step S32 and it is determined whether there was a caution indication in the previous period in which the ignition switch 43 was on. If it is determined that there was no caution indication during the previous period in which the ignition switch 43 was on, the CPU 41 proceeds to step S1 in FIG. 4A, and performs opening and closing control (hereinafter, referred to as normal control) of the first and second shutters 31, 32 according to the first embodiment.

If it is determined in step S31 that there is no operation record of the first and second shutters 31, 32 upon satisfaction of the operation condition during the previous period in which the ignition switch 43 was on, the CPU 41 proceeds to step S33 and closes the first and second shutters 31, 32 (second operating section). The CPU 41 functions as the second operating section. Alternatively, if it is determined in step S32 that there is the caution indication during the previous period in which the ignition switch 43 was on, the CPU 41 proceeds to step S33 and closes the first and second shutters 31, 32 (third operating section). The CPU 41 functions as the third operating section. Thus, the first and second movable fins 33, 34 move to the fully closed position.

Then, in step S34, it is determined whether the stop condition is satisfied. The stop condition is a case in which the amount of electricity supplied to the first and second drive units 37, 38 exceeds the certain level indicating restriction of the movement of the first and second movable fins 33, 34.

If it is determined in step S34 that the stop condition is not satisfied, the CPU 41 proceeds to step S35 and it is determined whether the predetermined time T2 has elapsed. If it is determined that the predetermined time T2 has not elapsed, the CPU 41 returns to step S34. If it is determined in step S34 that the stop condition is satisfied, the CPU 41 proceeds to step S36 and stops closing the first and second shutters 31, 32. Alternatively, if it is determined in step S35 that the predetermined time T2 has elapsed, the CPU 41 proceeds to step S37 and stops closing the first and second shutters 31, 32. That is, if it is determined in step S34 that the stop condition is not satisfied, the CPU 41 continues the closing operation of the first and second shutters 31, 32 until the predetermined time T2 elapses.

If the closing operation of the first and second shutters 31, 32 is stopped in step S36, it is determined in step S38 whether the first and second movable fins 33, 34 have reached the fully closed position. If it is determined that the first and second movable fins 33, 34 have not reached the fully closed position, the CPU 41 determines that an abnormality of some kind is caused that permits a third operating section stop condition to be satisfied (abnormality detection section), and proceeds to step S39. Furthermore, if the closing operation of the first and second shutters 31, 32 is stopped in step S37, the CPU 41 determines that there is an abnormality of some kind that prevents the third operating section stop condition from being satisfied (abnormality detection section), and proceeds to step S39.

In step S39, it is determined whether a retry has been executed. The retry is a process for resuming the closing operation of the first and second shutters 31, 32 suspended in step S36 or S37 when it is determined that there is an abnormality as described above (retry section). Therefore, if it is determined in step S39 that the retry has not been executed, the CPU 41 returns to step S33 and repeats the same process. If it is determined in step S39 that the retry has been executed, the CPU 41 proceeds to step S40 and determines that there is an abnormality (abnormality determining section). If the CPU 41 determines that there is an abnormality, the CPU 41 increments the abnormality determination counter CNT. Subsequently, in step S41, it is determined whether the number of times of the abnormality determination is greater than or equal to the predetermined number of times based on whether the abnormality determination counter CNT is greater than or equal to the predetermined number NM. If it is determined that the number of times of the abnormality determination is greater than or equal to the predetermined number of times (abnormality confirmation section), caution is indicated in step S42, and the operation of the first and second shutters 31, 32 is inhibited (inhibiting section).

Also, in step S38, if it is determined that the first and second movable fins 33, 34 have reached the fully closed position, the CPU 41 determines that it is normal in step S43 and proceeds to step S44. Alternatively, if it is determined that the number of times of abnormality determination is less than the predetermined number of times in step S41, the CPU 41 proceeds to step S44.

Then, in step S44, the CPU 41 opens the first and second shutters 31, 32 (the second operating section or the third operating section). Thus, the first and second movable fins 33, 34 move to the fully opened position.

Then, it is determined in step S45 whether the stop condition is satisfied. The stop condition is a case in which the amount of electricity supplied to the first and second drive units 37, 38 exceeds the certain level indicating restriction of the movement of the first and second movable fins 33, 34.

If it is determined in step S45 that the stop condition is not satisfied, the CPU 41 proceeds to step S46 and it is determined whether the predetermined time T1 has elapsed. If it is determined that the predetermined time T1 has not elapsed, the CPU 41 returns to step S45. If it is determined in step S45 that the stop condition is satisfied, the CPU 41 proceeds to step S47 and stops the opening operation of the first and second shutters 31, 32. Alternatively, if it is determined in step S46 that the predetermined time T1 has elapsed, the CPU 41 proceeds to step S48 and stops the opening operation of the first and second shutters 31, 32. That is, if it is determined in step S45 that the stop condition is not satisfied, the CPU 41 continues the opening operation of the first and second shutters 31, 32 until the predetermined time T1 elapses.

In step S47, if the opening operation of the first and second shutters 31, 32 is stopped, it is determined in step S49 whether the first and second movable fins 33, 34 have reached the fully opened position. If it is determined that the first and second movable fins 33, 34 have not reached the fully opened position, the CPU 41 determines that there is an abnormality of some kind that permits the stop condition to be satisfied (abnormality detection section), and proceeds to step S50. Furthermore, if the opening operation of the first and second shutters 31, 32 is stopped in step S48, the CPU 41 determines that there is an abnormality of some kind that prevents the stop condition from being satisfied (abnormality detection section), and proceeds to step S50.

In step S50, it is determined whether a retry has been executed. The retry is a process for resuming the opening operation of the first and second shutters 31, 32 suspended in step S47 or S48 when it is determined that there is an abnormality as described above (retry section). Therefore, if it is determined that the retry has not been executed in step S50, the CPU 41 returns to step S44 and repeats the same process. If it is determined that the retry has been executed in step S50, the CPU 41 proceeds to step S51 and determines that there is an abnormality (abnormality determining section). If the CPU 41 determines that there is an abnormality, the CPU 41 increments the abnormality determination counter CNT. Subsequently, in step S52, it is determined whether the number of times of the abnormality determination is greater than or equal to the predetermined number of times. If it is determined that the number of times of the abnormality determination is greater than or equal to the predetermined number of times (abnormality confirmation section), the CPU 41 proceeds to step S53 and a caution is indicated and the operation of the first and second shutters 31, 32 is inhibited (inhibiting section).

Also, if it is determined in step S49 that the first and second movable fins 33, 34 have reached the fully opened position, the CPU 41 proceeds to step S54 and determines that it is normal, and then, in step S55, the CPU 41 determines whether the first and second movable fins 33, 34 are both normal at the fully opened position and the fully closed position, that is, whether the closing operation of the first and second shutters 31, 32 is also determined to be normal (step S43). If the first and second movable fins 33, 34 are both determined to be normal at the fully opened position and fully closed position, the CPU 41 proceeds to step S56 and clears the abnormality determination counter CNT to zero. If it is determined in step S52 that the number of times of the abnormality determination is less than the predetermined number of times, the CPU 41 proceeds to step S1 of FIG. 4A and shifts to the afore-mentioned normal control. Alternatively, if it is determined in step S55 that the first and second movable fins 33, 34 are both not normal at the fully opened position and the fully closed position, that is, if the opening operation of the first and second shutters 31, 32 is not determined to be normal, the CPU 41 proceeds to step S1 of FIG. 4A, and shifts to the afore-mentioned normal control. If the abnormality determination counter CNT is cleared in step S56, the CPU 41 proceeds to step S1 of FIG. 4A and shifts to the afore-mentioned normal control.

Thus, for example, even if there is no satisfaction of the operation condition (the decision outcome of step S1 or step S2 is positive) and the associated operation of the first and second shutters 31, 32 in the normal control, there is an opportunity for detecting an abnormality in the first and second shutters 31, 32. Alternatively, if the first and second shutters 31, 32 are restored to the normal state before the ignition switch 43 is switched on currently, that is, while the ignition switch 43 is off (the decision outcome of step S41 or step S52 is negative), the caution indication is not executed, and the operation inhibiting state of the first and second shutters 31, 32 is cancelled (cancellation section). This is because, if the cause of the caution indication during the previous period in which the ignition switch 43 was on is, for example, the adhesion of the first and second shutters 31, 32 by freezing, the cause might be eliminated by subsequent melting. Thus, an opportunity is given for restoring to the normal state in such a case.

Unless the caution is indicated, the above-mentioned routine is repeated during the period in which the ignition switch 43 is on, and is terminated when the ignition switch 43 is switched off. In particular, when the CPU 41 operates the first and second shutters 31, 32 upon satisfaction of the operation condition (the decision outcome of step S61 or S62 is positive) during the period in which the ignition switch 43 is on, the CPU 41 stores and maintains the operation record of the execution of the operation in the memory 41a with a battery backup. Alternatively, when indicating the caution (in step S72 or [[S74]]] S84) during the period in which the ignition switch 43 is on, the CPU 41 stores and maintains the record of execution of the caution indication in the memory 41a with a battery backup.

Unless the caution is indicated, the above-mentioned routine is repeated during the period in which the ignition switch 43 is on, and is terminated when the ignition switch 43 is switched off. In particular, when the CPU 41 operates the first and second shutters 31, 32 upon satisfaction of the operation condition (the decision outcome of step S61 or S62 is positive) during the period in which the ignition switch 43 is on, the CPU 41 stores and maintains the operation record of the execution of the operation in the memory 41a with a battery backup. Alternatively, when indicating the caution (in step S72 or [[S74)]] S84) during the period in which the ignition switch 43 is on, the CPU 41 stores and maintains the record of execution of the caution indication in the memory 41a with a battery backup.

As described above, the second embodiment has the following advantages in addition to the advantages of the first embodiment.

(1) If there is no operation record of the first and second shutters 31, 32 upon satisfaction of the operation condition (the decision outcome of step S1 or step S2 is positive) during the previous period in which the ignition switch 43 was on, the first and second shutters 31, 32 are forced to operate the next time the ignition switch 43 is switched on. This provides an opportunity for detecting an abnormality. Thus, for example, the first and second shutters 31, 32 are prevented from being left for a long period of time without being given an opportunity for detection of an abnormality.

(2) If there was a caution indication during the previous period in which the ignition switch 43 was on, the operation of the first and second shutters 31, 32 is inhibited. In this case, the first and second shutters 31, 32 are forced to operate at the next time at which the ignition switch 43 is switched on, and an opportunity for detection of an abnormality is provided. Then, if the abnormality is not detected (the decision outcome of step S41 or step S52 is negative), the operation inhibiting state of the first and second shutters 31, 32 is cancelled. Thus, the operation inhibition of the first and second shutters 31, 32 is prevented from being unnecessarily continued due to the temporary caution indication.

Third Embodiment

A third embodiment of the present invention will now be described with reference to FIGS. 6A and 6B. The third embodiment mainly differs from the first embodiment in that the abnormality is detected based on the movement amount of the first and second shutters 31, 32. Thus, the detailed description of the part that is the same as the first embodiment will be omitted. The movement amount of the first and second shutters 31, 32 is obtained by monitoring the opened/closed positions at the point in time when the operation of the first and second shutters 31, 32 is started and is stopped with the pulse sensor 45, and calculating the difference between the opened/closed positions (relative value).

Figure 6A:
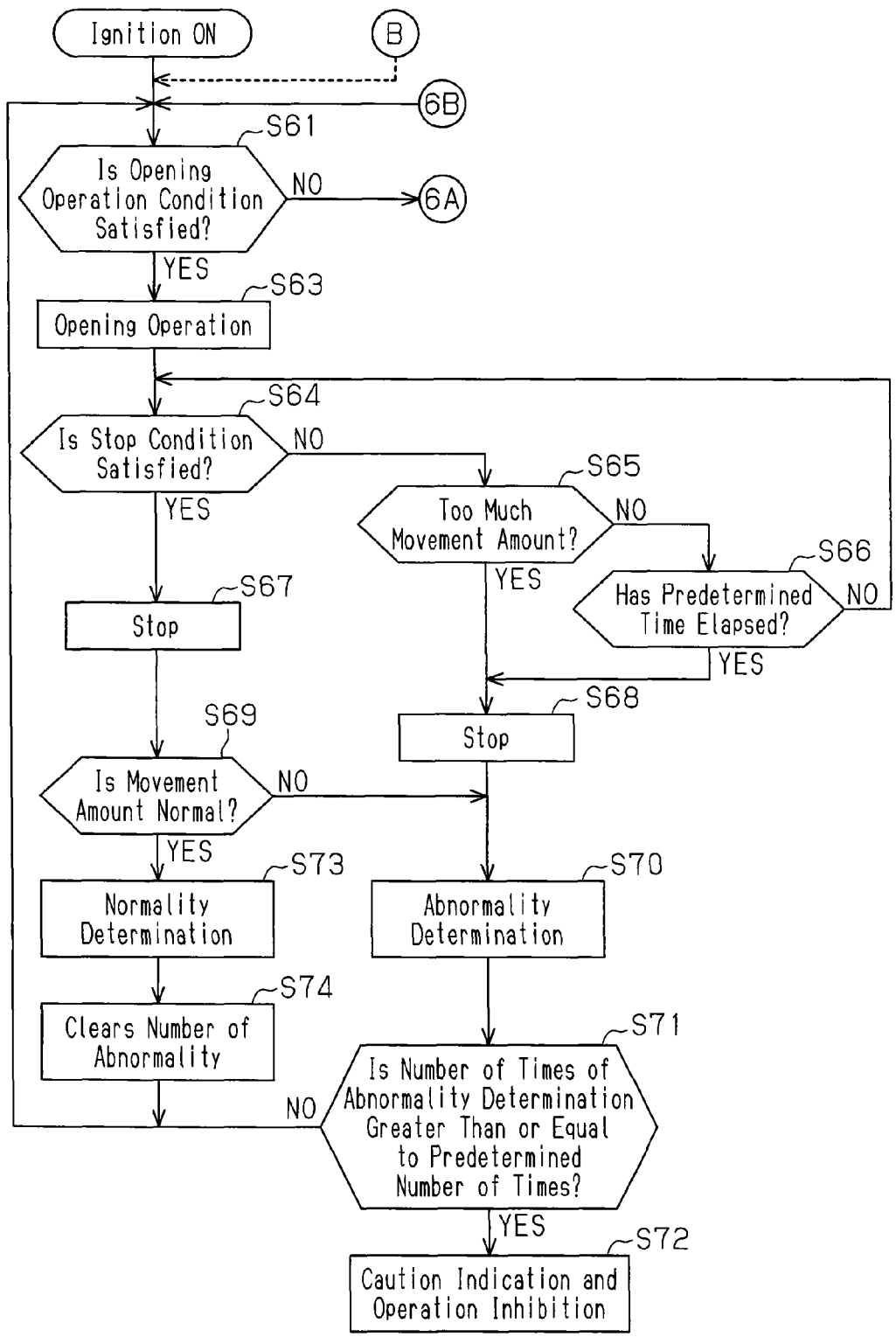
FIGS. 6A and 6B are flowcharts illustrating the control manner of a grille shutter control device according to a third embodiment of the present invention.
Figure 6B:
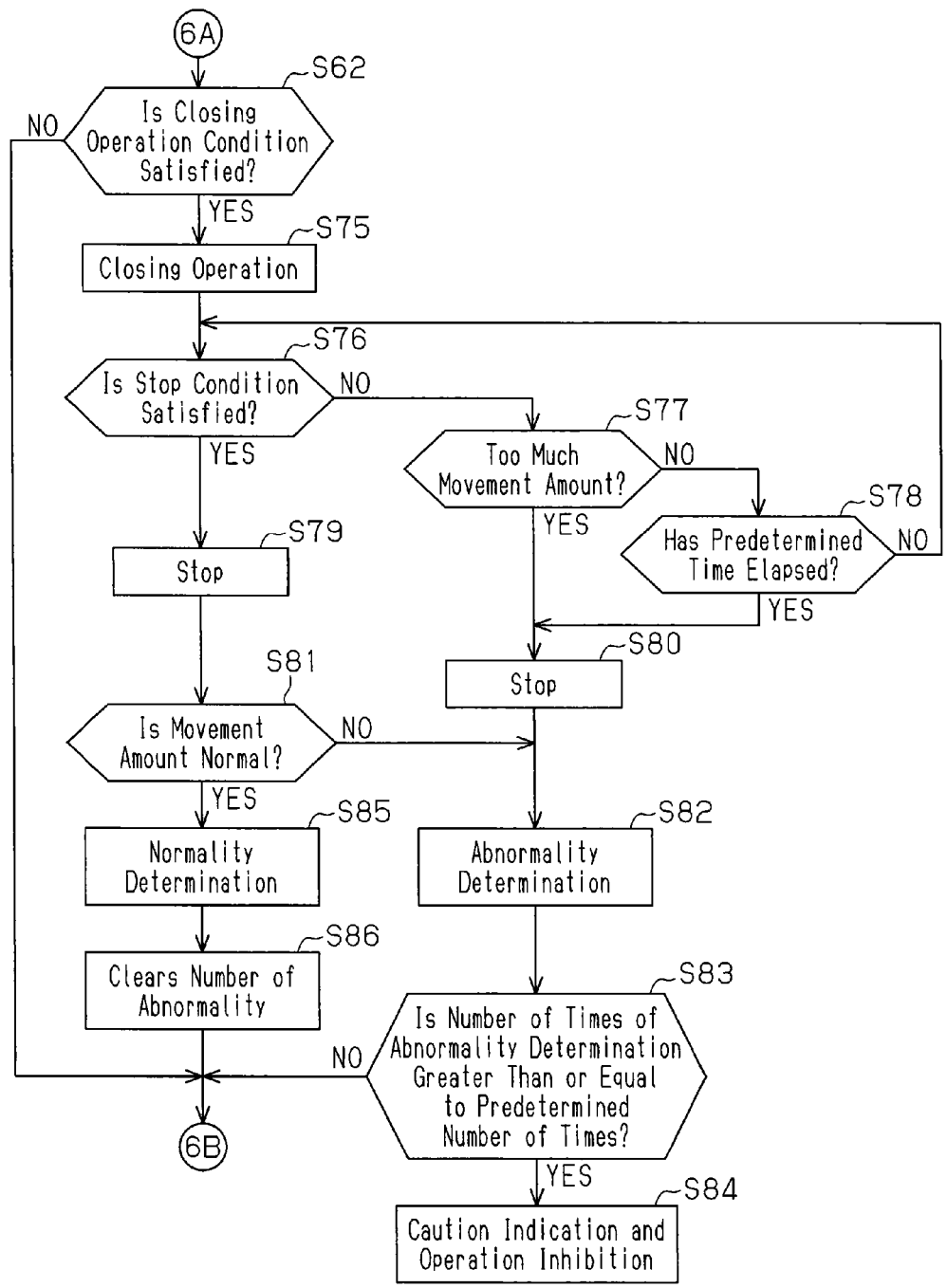

As shown in FIG. 6A, the routine is started when the ignition switch 43 is switched on. In step S61, it is determined whether the opening operation condition is satisfied. If it is determined that the opening operation condition is not satisfied, the CPU 41 proceeds to step S62 and it is determined whether the closing operation condition is satisfied. If it is determined that the closing operation condition is not satisfied, the CPU 41 returns to step S61.

If it is determined in step S61 that the opening operation condition is satisfied, the CPU 41 proceeds to step S63, and opens the first and second shutters 31, 32 (first operating section). Thus, the first and second movable fins 33, 34 move to the fully opened position.

Then, it is determined in step S64 whether the stop condition is satisfied. The stop condition is a case in which the amount of electricity supplied to the first and second drive units 37, 38 exceeds the certain level indicating restriction of the movement of the first and second movable fins 33, 34.

If it is determined in step S64 that the stop condition is not satisfied, the CPU 41 proceeds to step S65 and determines whether the movement amount of the first and second shutters 31, 32 exceeds a predetermined movement amount A1. The predetermined movement amount A1 is set based on the movement amount of the first and second shutters 31, 32 by which the first and second movable fins 33, 34 that have started to open will reliably complete the movement to the fully opened position. If it is determined that the movement amount of the first and second shutters 31, 32 has not exceeded the predetermined movement amount A1, the CPU 41 proceeds to step S66 and determines whether the predetermined time T1 has elapsed. If it is determined that the predetermined time T1 has not elapsed, the CPU 41 returns to step S64. If it is determined in step S64 that the stop condition is satisfied, the CPU 41 proceeds to step S67 and stops the opening operation of the first and second shutters 31, 32. If it is determined in step S65 that the movement amount of the first and second shutters 31, 32 exceeds the predetermined movement amount A1, the CPU 41 proceeds to step S68 and stops the opening operation of the first and second shutters 31, 32. Alternatively, if it is determined in step S66 that the predetermined time T1 has elapsed, the CPU 41 proceeds to step S68 and stops the opening operation of the first and second shutters 31, 32. That is, if it is determined in step S64 that the stop condition is not satisfied, the CPU 41 continues the opening operation of the first and second shutters 31, 32 until the movement amount of the first and second shutters 31, 32 exceeds the predetermined movement amount A1, or until the predetermined time T1 elapses.

If the opening operation of the first and second shutters 31, 32 is stopped in step S67, the CPU 41 proceeds to step S69 and determines whether the movement amount of the first and second shutters 31, 32 is normal. More specifically, it is determined whether the movement amount, which is based on the difference between the opened/closed positions of the first and second shutters 31, 32 detected by the pulse sensor 45 at the point in time when the operation is started and when the operation is stopped, is greater than or equal to a predetermined movement amount Ao corresponding to the fully opened position of the first and second movable fins 33, 34. If it is determined that the movement amount of the first and second shutters 31, 32 is less than the movement amount Ao and is not normal, the CPU 41 determines that there is an abnormality of some kind that permits the stop condition to be satisfied (abnormality detection section), and proceeds to step S70 and determines that there is an abnormality. Furthermore, if the opening operation of the first and second shutters 31, 32 is stopped in step S68, the CPU 41 determines that there is an abnormality of some kind that does prevents the stop condition from being satisfied (abnormality detection section), and proceeds to step S70 and determines that there is an abnormality. This is because, for example, if there is an abnormality in the power transmission of the first and second drive units 37, 38 (including the mechanism that links the first and second shutters 31, 32), apparently, greater movement amount is required for the stop condition to be satisfied or extended time is required for the stop condition to be satisfied. The abnormality in the power transmission includes the state in which the first and second movable fins 33, 34 are immobile to the fully opened position due to, for example, slipping caused by missing teeth of the gear. If it is determined that there is an abnormality, the CPU 41 increments an abnormality determining counter CNT1 that counts the number of times of the determination.

Subsequently, in step S71, it is determined whether the number of times of the abnormality determination is greater than or equal to a predetermined number of times based on whether the abnormality determination counter CNT1 is greater than or equal to a predetermined number NM1. If it is determined that the number of times of the abnormality determination is greater than or equal to the predetermined number of times (abnormality determining section), the CPU 41 proceeds to step S72, indicates a caution and inhibits the operation of the first and second shutters 31, 32 (inhibiting section).

Also, in step S69, if it is determined that the movement amount of the first and second shutters 31, 32 is greater than or equal to the movement amount Ao and is normal, the CPU 41 proceeds to step S73 and determines that it is normal. Then, in step S74, the CPU 41 clears the abnormality determination counter CNT1 to zero, and returns to step S61. Alternatively, in step S71, if it is determined that the number of times of abnormality determination is less than the predetermined number of times, the CPU 41 returns to step S61.

In step S62, if it is determined that the closing operation condition is satisfied, the CPU 41 proceeds to step S75, and closes the first and second shutters 31, 32 (first operating section). Thus, the first and second movable fins 33, 34 move to the fully closed position.

Then, in step S76, it is determined whether the stop condition is satisfied. The stop condition is a case in which the amount of electricity supplied to the first and second drive units 37, 38 exceeds the certain level indicating restriction of the movement of the first and second movable fins 33, 34.

If it is determined in step S76 that the stop condition is not satisfied, the CPU 41 proceeds to step S77 and determines whether the movement amount of the first and second shutters 31, 32 exceeds a predetermined movement amount A2. The predetermined movement amount A2 is set based on the movement amount of the first and second shutters 31, 32 by which the first and second movable fins 33, 34 that have started to close will reliably complete the movement to the fully closed position. If it is determined that the movement amount of the first and second shutters 31, 32 has not exceeded the predetermined movement amount A2, the CPU 41 proceeds to step S78 and determines whether the predetermined time T2 has elapsed. If it is determined that the predetermined time T2 has not elapsed, the CPU 41 returns to step S76. If it is determined in step S76 that the stop condition is satisfied, the CPU 41 proceeds to step S79 and stops closing the first and second shutters 31, 32. If it is determined in step S77 that the movement amount of the first and second shutters 31, 32 exceeds the predetermined movement amount A2, the CPU 41 proceeds to step S80 and stops the closing operation of the first and second shutters 31, 32. Alternatively, if it is determined in step S78 that the predetermined time T2 has elapsed, the CPU 41 proceeds to step S80 and stops closing the first and second shutters 31, 32. That is, if it is determined in step S76 that the stop condition is not satisfied, the CPU 41 continues the closing operation of the first and second shutters 31, 32 until the movement amount of the first and second shutters 31, 32 exceeds the predetermined movement amount A2, or the predetermined time T2 elapses.

In step S79, if the closing operation of the first and second shutters 31, 32 is stopped, the CPU 41 proceeds to step S81 and determines whether the movement amount of the first and second shutters 31, 32 is normal. More specifically, it is determined whether the movement amount, which is based on the difference between the opened/closed positions of the first and second shutters 31, 32 detected by the pulse sensor 45 at the point in time when the operation is started and when the operation is stopped, is greater than or equal to a predetermined movement amount Ac corresponding to the fully closed position of the first and second movable fins 33, 34. If it is determined that the movement amount of the first and second shutters 31, 32 is less than the movement amount Ac and is not normal, the CPU 41 determines that there is an abnormality of some kind that permits the stop condition to be satisfied (abnormality detection section), and proceeds to step S82 and determines that there is an abnormality. Furthermore, in step S80, if the closing operation of the first and second shutters 31, 32 is stopped, the CPU 41 determines that there is an abnormality of some kind that prevents the stop condition from being satisfied (abnormality detection section), and proceeds to step S82 and determines that there is an abnormality. This is because, for example, if there is an abnormality in the power transmission of the first and second drive units 37, 38 (including the mechanism that links the first and second shutters 31, 32), apparently, greater movement amount is required for the stop condition to be satisfied or extended time is required for the stop condition to be satisfied. If the CPU 41 determines that there is an abnormality, the CPU 41 increments the abnormality determination counter CNT1. That is, the abnormality determination counter CNT1 is a counted value of the number of times of the abnormality determination associated with opening/closing operation of the first and second shutters 31, 32.

Subsequently, in step S83, it is determined whether the number of times of the abnormality determination is greater than or equal to the predetermined number of times. If it is determined that the number of times of the abnormality determination is greater than or equal to the predetermined number of times (abnormality determining section), the CPU 41 proceeds to step S84, indicates a caution and inhibits the operation of the first and second shutters 31, 32 (inhibiting section).

Also, in step S81, if it is determined that the movement amount of the first and second shutters 31, 32 is greater than or equal to the movement amount Ac and is normal, the CPU 41 proceeds to step S85 and determines that it is normal. Then, in step S86, the CPU 41 clears the abnormality determining counter CNT1 to zero, and returns to step S61. Alternatively, in step S83, if it is determined that the number of times of abnormality determination is less than the predetermined number of times, the CPU 41 returns to step S61.

Unless the caution is indicated, the above-mentioned routine is repeated during the period in which the ignition switch 43 is on, and is terminated when the ignition switch 43 is switched off. In particular, when the CPU 41 operates the first and second shutters 31, 32 upon satisfaction of the operation condition (the decision outcome of step S61 or S62 is positive) during the period in which the ignition switch 43 is on, the CPU 41 stores and maintains the operation record of the execution of the operation in the memory 41a with a battery backup. Alternatively, when indicating the caution (in step S72 or S84) during the period in which the ignition switch 43 is on, the CPU 41 stores and maintains the record of execution of the caution indication in the memory 41a with a battery backup.

As described above, the present embodiment has the following advantages in addition to the advantages (1), (5), and (6) of the first embodiment.

(1) If an abnormality is detected (the decision outcome of step S65, S66, S77, or S78 is positive, or the decision outcome of step S69 or S81 is negative) by the predetermined number of times (the decision outcome of step S71 or S83 is positive), the CPU 41 determines that there is an abnormality. Then, based on the determined abnormality, the indicator lamp 48 informs the user of the abnormality in the operation of the first and second shutters 31, 32. Thus, for example, even if the abnormality is temporarily detected, an unnecessary alarm is prevented from being given by the indicator lamp 48, and an inconvenience caused by the alarm is reduced. Alternatively, by reducing a false alarm by the indicator lamp 48, the reliability of the alarm (caution indication) is improved.

(2) The pulse sensor 45 monitors the movement amounts when the operation of the first and second shutters 31, 32 is stopped upon satisfaction of the stop condition. If the movement amounts are less than the predetermined movement amounts Ao, Ac, the abnormality is detected. Alternatively, the elapsed time after starting the operation of the first and second shutters 31, 32 is monitored by the timer 41b. If the stop condition is not satisfied although the elapsed time exceeds the predetermined time (T1, T2), the abnormality is detected.

Fourth Embodiment

A grille shutter control device according to a fourth embodiment of the present invention will now be described with reference to FIG. 7. The fourth embodiment differs from the third embodiment in that, for example, during the previous period in which the ignition switch 43 was on, if there is no operation record of the first and second shutters 31, 32 upon satisfaction of the operation condition (the decision outcome of step S61 or S62 is positive), or if there was the caution indication and the operation inhibition (step S72 or S84), the first and second shutters 31, 32 are forced to operate when the ignition switch 43 is switched on. Thus, the detailed description of the part that is the same as the third embodiment will be omitted.

As shown in FIG. 7, the routine is started when the ignition switch 43 is switched on. In step S91, it is determined whether there is an operation record of the first and second shutters 31, 32 upon satisfaction of the operation condition during the previous period in which the ignition switch 43 was on. If it is determined that there is the operation record during the previous period in which the ignition switch 43 was on, the CPU 41 proceeds to step S92 and determines whether there is a caution indication in the previous period in which the ignition switch 43 is on. If it is determined that there is no caution indication during the previous period in which the ignition switch 43 was on, the CPU 41 proceeds to step S61 in FIG. 6A, and performs opening and closing control (hereinafter, referred to as a normal control) of the first and second shutters 31, 32 according to the third embodiment.

If it is determined in step S91 that there is no operation record of the first and second shutters 31, 32 upon satisfaction of the operation condition during the previous period in which the ignition switch 43 was on, the CPU 41 proceeds to step S93 and closes the first and second shutters 31, 32 (second operating section). Alternatively, in step S92, if it is determined that there was a caution indication during the previous period in which the ignition switch 43 was on, the CPU 41 proceeds to step S93 and closes the first and second shutters 31, 32 (third operating section). Thus, the first and second movable fins 33, 34 move to the fully closed position.

Then, in step S94, it is determined whether the stop condition is satisfied. The stop condition is a case in which the amount of electricity supplied to the first and second drive units 37, 38 exceeds the certain level indicating restriction of the movement of the first and second movable fins 33, 34.

On the precondition that it is determined that the stop condition is satisfied in step S94, the CPU 41 stops closing the first and second shutters 31, 32 in step S95. Subsequently, in step S96, the CPU 41 opens the first and second shutters 31, 32 (the second operating section or the third operating section). Thus, the first and second movable fins 33, 34 move to the fully opened position. Then, in step S97, it is determined whether the stop condition is satisfied. The stop condition is a case in which the amount of electricity supplied to the first and second drive units 37, 38 exceeds the certain level indicating restriction of the movement of the first and second movable fins 33, 34.

If it is determined in step S97 that the stop condition is not satisfied, the CPU 41 proceeds to step S98 and determines whether the movement amount of the first and second shutters 31, 32 exceeds the predetermined movement amount A1. If it is determined that the movement amount of the first and second shutters 31, 32 has not exceeded the predetermined movement amount A1, the CPU 41 proceeds to step S99 and determines whether the predetermined time T1 has elapsed. If it is determined that the predetermined time T1 has not elapsed, the CPU 41 returns to step S97. Also, if it is determined in step S97 that the stop condition is satisfied, the CPU 41 proceeds to step S100 and stops the opening operation of the first and second shutters 31, 32. If it is determined in step S98 that the movement amount of the first and second shutters 31, 32 exceeds the predetermined movement amount A1, the CPU 41 proceeds to step S101 and stops the opening operation of the first and second shutters 31, 32. Alternatively, in step S99, if it is determined that the predetermined time T1 has elapsed, the CPU 41 proceeds to step S101 and stops the opening operation of the first and second shutters 31, 32. That is, if it is determined in step S97 that the stop condition is not satisfied, the CPU 41 continues the opening operation of the first and second shutters 31, 32 until the movement amount of the first and second shutters 31, 32 exceeds the predetermined movement amount A1, or the predetermined time T1 elapses.

If the opening operation of the first and second shutters 31, 32 is stopped in step S100, the CPU 41 proceeds to step S102 and determines whether the movement amount of the first and second shutters 31, 32 is normal. If it is determined that the movement amount of the first and second shutters 31, 32 is not normal, the CPU 41 determines that there is an abnormality of some kind that permits the stop condition to be satisfied (abnormality detection section), and proceeds to step S103 and determines that there is an abnormality. Furthermore, in step S101, if the opening operation of the first and second shutters 31, 32 is stopped, the CPU 41 determines that there is an abnormality of some kind that prevents the stop condition from being satisfied (abnormality detection section), and proceeds to step S103 and determines that there is an abnormality. If the CPU 41 determines that there is an abnormality, the CPU 41 increments the abnormality determination counter CNT1. That is, the abnormality determination counter CNT1 at this stage in the current routine is a counted value of only the number of times of the abnormality determination associated with opening operation of the first and second shutters 31, 32. This is the abnormality may be basically detected in only one of the opening operation and the closing operation when, in particular, detecting the abnormality based on the movement amount of the first and second shutters 31, 32.

Subsequently, in step S104, it is determined whether the number of times of the abnormality determination is greater than or equal to a predetermined number of times. If it is determined that the number of times of the abnormality determination is greater than or equal to the predetermined number of times (abnormality determining section), the CPU 41 proceeds to step S105, indicates a caution and inhibits the operation of the first and second shutters 31, 32 (inhibiting section).

Also, in step S102, if it is determined that the movement amount of the first and second shutters 31, 32 is normal, the CPU 41 proceeds to step S106 and determines that it is normal. Then, in step S107, the CPU 41 clears the abnormality determination counter CNT1 to zero, and proceeds to step S61 of FIG. 6A and shifts to the above-described normal control. Alternatively, if it is determined in step S104 that the number of times of the abnormality determination is less than the predetermined number of times, the CPU 41 proceeds to step S61 in FIG. 6A and shifts to the above-described normal control.

Thus, there is an opportunity for detecting an abnormality in the first and second shutters 31, 32 even if, for example, the operation condition is not satisfied (the decision outcome of step S61 or step S62 is positive) and the associated operation of the first and second shutters 31, 32 is not performed in the normal control. Alternatively, if the first and second shutters 31, 32 are restored to the normal state before the ignition switch 43 is switched on currently, that is, while the ignition switch 43 is off (the decision outcome of step S104 is negative), the caution indication is not executed, and the operation inhibiting state of the first and second shutters 31, 32 is cancelled (cancellation section).

Unless the caution is indicated, the above-mentioned routine is executed during the period in which the ignition switch 43 is on, and is terminated when the ignition switch 43 is switched off. In particular, when indicating the caution (in step S105) during the period in which the ignition switch 43 is on, the CPU 41 stores and maintains the record of execution of the caution indication in the memory 41a with a battery backup.

As described above, the fourth embodiment has the following advantages in addition to the advantages of the second and third embodiments.

(1) The process is simplified by detecting the abnormality in only the opening operation of the first and second shutters 31, 32 (the decision outcome of step S98 or S99 is positive, or the decision outcome of step S102 is negative).

The above described embodiments may be modified as follows.

In the first embodiment, a retry performed when an abnormality is detected (the decision outcome of step S5 or S16 is positive, or the decision outcome of step S8 or S19 is negative) may be omitted or may be performed three or more times. Also, in a case in which a retry is performed, the retry may be performed after waiting for a predetermined time.

In the second embodiment, a retry performed when an abnormality is detected (the decision outcome of step S35 or S46 is positive, or the decision outcome of step S38 or S49 is negative) may be omitted or may be performed three or more times. Also, in a case in which a retry is performed, the retry may be performed after waiting for a predetermined time.

In the second embodiment, the abnormality detection prior to the normal control may be performed only in either the opening operation or the closing operation of the first and second shutters 31, 32.

In the third embodiment, when detecting an abnormality (the decision outcome of steps S65, S66, S77 or S78 is positive, or the decision outcome of step S69 or S81 is negative), the retry may be performed several times. In this case, the retry may be performed after waiting for a predetermined time.

In the fourth embodiment, when detecting an abnormality (the decision outcome of step S98 or S99 is positive, or the decision outcome of step S102 is negative), the retry may be performed several times. In this case, the retry may be performed after waiting for a predetermined time.

In the fourth embodiment, the abnormality detection prior to the normal control may be performed in the closing operation instead of or in addition to the opening operation of the first and second shutters 31, 32.

In the first and second embodiments, determination of the fully opened position or the fully closed position may be made by, for example, an on/off signal of a limit switch.

In each of the illustrated embodiments, if the ignition switch 43 is switched off in the state in which the caution is indicated and the operation of the first and second shutters 31, 32 is inhibited, the caution indication may be temporarily cancelled. Then, the first and second shutters 31, 32 may be forced to operate at the next time in which the ignition switch 43 is switched on (third operating section). In this case, an opportunity for detecting an abnormality associated with operation of the first and second shutters 31, 32 is provided at the next time in which the ignition switch 43 is switched on. At this time, if the abnormality is not detected, the CPU 41 cancels the caution indication and the operation inhibiting state of the first and second shutters 31, 32 and restores to the normal state. If the abnormality is detected, the caution indication and the operation inhibition of the first and second shutters 31, 32 are immediately performed.

In each of the illustrated embodiments, the abnormality of the first and second shutters 31, 32 may be detected in a case in which the stop condition is satisfied although the elapsed time after starting the operation of the first and second shutters 31, 32 has not reached the predetermined time (first predetermined time). This is because, for example, if the load is increased due to adhesion of the first and second shutters 31, 32 or a foreign object caught in the first and second shutters 31, 32, the stop condition is satisfied earlier than normal. Thus, the abnormality can be detected by monitoring the elapsed time after the operation of the first and second shutters 31, 32 is started, and if the stop condition is satisfied although the elapsed time has not reached the predetermined time.

In each of the illustrated embodiments, the user may be informed each time an abnormality is detected, or each time an abnormality determination is made after a retry.

In each of the illustrated embodiments, determination of the stop condition may be performed utilizing appropriate physical quantity that has correlation with the driving force of the first and second drive units 37, 38.

In each of the illustrated embodiments, at the time when a caution is indicated, the subsequent operation of the first and second shutters 31, 32 does not necessarily have to be inhibited.

In each of the illustrated embodiments, upon detection of the abnormality, the user may be informed by an audible alarm using, for example, a speaker or a buzzer serving as the informing section.

In each of the illustrated embodiments, the first and second drive units 37, 38 may be configured by a single drive unit, and the first and second shutters 31, 32 may be opened or closed together.

In each of the illustrated embodiments, for example, by moving the first and second shutters 31, 32 to the fully closed position when, as the closing operation starting condition, the ambient temperature is low, the warm-up performance of the engine 2 is improved. By moving the first and second shutters 31, 32 to the fully opened position when, as the opening operation starting condition, the engine coolant temperature is high, the cooling performance is improved.

In each of the illustrated embodiments, for example, by moving the first and second shutters 31, 32 to the fully closed position when, as the closing operation starting condition, the heater is in use or when the refrigerant pressure is high, the warm-up performance of the engine 2 is improved. By moving the first and second shutters 31, 32 to the fully opened position when, as the opening operation starting condition, cooling or the refrigerant pressure is high in this state, the cooling performance is improved.

In each of the illustrated embodiments, for example, by moving the first and second shutters 31, 32 to the fully closed position when, as the closing operation starting condition, the vehicle speed is high, air resistance (coefficient of air resistance) and lift force are reduced, and down force that pulls the vehicle downward is generated by the flow of air ahead of the vehicle to the lower side of the floor. This ensures stable travelling state of the vehicle.

In each of the illustrated embodiments, opening and closing of the first and second shutters 31, 32 based on the vehicle information may be controlled to be located at any opened/closed position between the fully closed position and the fully opened position.

In each of the illustrated embodiments, the first and second drive units 37, 38 may be configured by a single drive unit, and only one of the first and second shutters 31, 32 may be opened or closed. That is, the other one of the first and second shutters 31, 32 may be, for example, fixed in the open state. In this case, the second shutter 32 is preferably fixed in the open state.

In each of the illustrated embodiments, the first and second shutters 31, 32 may be opened and closed by, for example, sliding motion.

The invention claimed is:

1. A grille shutter control device comprising:
a control section, which is configured to control a drive unit that selectively opens and closes a shutter adapted to be provided in an air introduction path for introducing air ahead of a vehicle into an engine compartment;
an abnormality detection section configured to detect an abnormality in operation of the shutter based on the state after starting the operation of the shutter;
an informing section, which informs a user of an abnormality in the operation of the shutter based on the abnormality detected by the abnormality detection section;
an inhibiting section configured to control inhibition of the operation of the shutter in accordance with an alarm given by the informing section;
a memory section configured to store an operation record of the shutter during a previous period in which the ignition was on, the previous period being a period from when the ignition was previously switched on to when the ignition switch was switched off;
a first operating section, wherein, if there was an alarm given by the informing section during the previous period in which an ignition switch was on as determined based upon the stored operation record, then the first operating section operates the shutter based upon the stored operation record when the ignition switch is switched on in a period subsequent to the previous period; and
a cancellation section configured to cancel the state in which the operation of the shutter is inhibited by the inhibiting section based on non-detection of the abnormality by the abnormality detection section associated with operation of the shutter by the first operating section.

2. The grille shutter control device according to claim 1, further comprising:
a retry section, which resumes the operation of the shutter when the abnormality is detected by the abnormality detection section; and
an abnormality determining section configured to determine an abnormality in the operation of the shutter if the detection of the abnormality by the abnormality detection section is repeated by a predetermined number of times as the operation of the shutter is resumed by the retry section,
wherein the informing section informs the user of an abnormality in the operation of the shutter based on the determined abnormality.

3. The grille shutter control device according to claim 2, further comprising an abnormality confirmation section configured to confirm an abnormality in the operation of the shutter when the abnormality determination by the abnormality determining section is repeated by a predetermined number of times,
wherein the informing section informs the user of an abnormality in the operation of the shutter based on the confirmed abnormality in the operation.

4. The grille shutter control device according to claim 1, further comprising an abnormality determining section configured to determine an abnormality in the operation of the shutter if the detection of the abnormality by the abnormality detection section is repeated by a predetermined number of times,
wherein the informing section informs the user of an abnormality in the operation of the shutter based on the determined abnormality.

5. The grille shutter control device according to claim 1, further comprising:
a second operating section, which operates the shutter based on vehicle information; and
a third operating section, wherein, if there is no operation record of the shutter by the second operating section based on the vehicle information during a previous period in which an ignition switch was on, the third operating section operates the shutter when the ignition switch is switched on.

6. The grille shutter control device according to claim 1, wherein
the abnormality detection section detects an abnormality in the operation of the shutter when at least one of the following is the case:
after the operation of the shutter is started, the movement position is out of a predetermined range when the operation is stopped upon satisfaction of a predetermined stop condition;
after the operation of the shutter is started, the movement amount is less than a predetermined movement amount when the operation is stopped upon satisfaction of the predetermined stop condition;
the predetermined stop condition is satisfied although the elapsed time after starting the operation of the shutter has not reached a first predetermined time; and
the predetermined stop condition is not satisfied although the elapsed time after starting the operation of the shutter has exceeded a second predetermined time.

7. A grille shutter control device comprising:
a control section, which is configured to control a drive unit that selectively opens and closes a shutter adapted to be provided in an air introduction path for introducing air ahead of a vehicle into an engine compartment;
an abnormality detection section configured to detect an abnormality in operation of the shutter based on the state after starting the operation of the shutter;
an informing section, which informs a user of an abnormality in the operation of the shutter based on the abnormality detected by the abnormality detection section;
an inhibiting section configured to control inhibition of the operation of the shutter in accordance with an alarm given by the informing section;
a memory section configured to store an operation record of the shutter during a previous period in which the ignition was on, the previous period being a period from when the ignition was previously switched on to when the ignition switch was switched off; and a first operating section, wherein, when there was an alarm given by the informing section during the previous period in which an ignition switch was on as determined based upon the stored operation record, the first operating section operates the shutter based upon the stored operation record when the ignition switch is switched on in a period subsequent to the previous period, wherein based on non-detection of the abnormality by the abnormality detection section associated with the operation of the shutter by the first operating section, the grille shutter control device cancels the alarm given by the informing section and the state in which the operation of the shutter is inhibited by the inhibiting section, and based on detection of the abnormality by the abnormality detection section associated with the operation of the shutter by the first operating section, the grille shutter control device immediately informs the user of the detection by using the informing section and inhibits operation of the shutter by using the inhibiting section.

8. The grille shutter control device according to claim 7, further comprising:

a second operating section, which operates the shutter based on vehicle information; and a third operating section, wherein, if there is no operation record of the shutter by the second operating section based on the vehicle information during the previous period in which the ignition switch was on, the third operating section operates the shutter when the ignition switch is switched on.

* * * * *